US008737362B2

(12) United States Patent
Elezabi et al.

(10) Patent No.: US 8,737,362 B2
(45) Date of Patent: May 27, 2014

(54) METHODS, SYSTEMS, AND COMPUTER READABLE MEDIA FOR INTERFERENCE-MINIMIZING CODE ASSIGNMENT AND SYSTEM PARAMETER SELECTION FOR CODE DIVISION MULTIPLE ACCESS (CDMA) NETWORKS

(75) Inventors: Ayman Yehia Elezabi, Cairo (EG); Mohamed Tawfeek Kashef, Cairo (EG); Mohamed Mahmoud Abdallah, Giza (EG); Mohamed M. Khairy, Giza (EG)

(73) Assignee: The American University in Cairo, Cairo (EG)

( * ) Notice: Subject to any disclaimer, the term of this patent is extended or adjusted under 35 U.S.C. 154(b) by 534 days.

(21) Appl. No.: 12/982,591

(22) Filed: Dec. 30, 2010

(65) Prior Publication Data

US 2011/0188478 A1 Aug. 4, 2011

Related U.S. Application Data

(63) Continuation of application No. 61/291,349, filed on Dec. 30, 2009.

(51) Int. Cl.
*H04B 7/216* (2006.01)
*H04W 4/00* (2009.01)
*H04J 11/00* (2006.01)

(52) U.S. Cl.
USPC ............................. 370/335; 370/208; 370/328

(58) Field of Classification Search
None
See application file for complete search history.

(56) References Cited

U.S. PATENT DOCUMENTS

| 5,345,469 | A  | * | 9/1994  | Fulghum ..................... 370/342 |
| 6,023,462 | A  |   | 2/2000  | Nieczyporowicz et al. |
| 6,141,372 | A  | * | 10/2000 | Chalmers ..................... 375/147 |
| 2002/0045433 | A1 | * | 4/2002  | Vihriala ....................... 455/313 |
| 2002/0089950 | A1 | * | 7/2002  | Sourour et al. .............. 370/335 |
| 2002/0097703 | A1 |   | 7/2002  | Nieczyporowicz et al. |

(Continued)

OTHER PUBLICATIONS

Kashef et al., "System Parameter Selection for Asymmetric Underlay CDMA Networks With Interference-Minimizing Code Assignment," IEEE SPAWC, Italy (Jun. 2009).

(Continued)

*Primary Examiner* — Jutai Kao
*Assistant Examiner* — Kwang Yao
(74) *Attorney, Agent, or Firm* — Jenkins, Wilson, Taylor & Hunt, P.A.

(57) ABSTRACT

A method for interference-minimizing code assignment and system parameter selection for code division multiple access (CDMA) networks is disclosed. The method is performed at a base station or mobile station configured to operate in a CDMA radio network. The method includes receiving transmissions from user devices seeking to access the CDMA radio network. A spreading code is selected for a first user device seeking to access the network, using at least one cross-correlation parameter, to reduce multiple access interference between communications involving the first user device and other devices using the CDMA network. The method does not require knowledge of the active user codes or even the codebook from which these codes are assigned. Furthermore, it does not require knowledge of bit or chip epoch or the received powers of active users. However, the method can benefit from such knowledge in several ways, examples of which are disclosed. A method for explicitly estimating the bit or chip epoch is also disclosed.

35 Claims, 17 Drawing Sheets

(56) References Cited

U.S. PATENT DOCUMENTS

| | | | |
|---|---|---|---|
| 2002/0176438 A1* | 11/2002 | Karjalainen | 370/441 |
| 2005/0185736 A1* | 8/2005 | Pajukoski | 375/296 |
| 2005/0226187 A1* | 10/2005 | Minato | 370/335 |
| 2005/0249269 A1* | 11/2005 | Tomasin et al. | 375/148 |
| 2007/0211787 A1 | 9/2007 | Harris et al. | |
| 2008/0081652 A1 | 4/2008 | Kennedy | |
| 2009/0103480 A1* | 4/2009 | Tong et al. | 370/328 |
| 2009/0207931 A1* | 8/2009 | Ohwatari et al. | 375/267 |
| 2009/0247201 A1 | 10/2009 | Ye et al. | |
| 2009/0253421 A1* | 10/2009 | Camp et al. | 455/418 |
| 2010/0046484 A1* | 2/2010 | Elliott | 370/337 |
| 2010/0081387 A1 | 4/2010 | Shi et al. | |
| 2010/0197332 A1 | 8/2010 | Kyperountas et al. | |

OTHER PUBLICATIONS

Elezabi et al., "Cognitive Interference-Minimizing Code Assignment for Underlay CDMA Networks in Asynchronous Multipath Fading Channels, " in Proceedings IWCMC, pp. 1279-1283 (Jun. 2009).

Attar et al., "Cognitive Radio Transmission Based on Direct Sequence MC-CDMA," IEEE Transaction on Wireless Communications, vol. 7, pp. 1157-1162 (Apr. 2008).

Elezabi et al., "CDMA Underlay Network With Interference-Minimizing Code Assignment and Semi-Blind Interference Suppression, " Wireless Communications and Modile Computing (Copyright 2008).

Elezabi, "Reliability-Based Partial Interference Cancellation and Iterative Decoding for DS-CDMA Over Fading Channels," IEEE International Conference on Communications, Glasgow, Scotland (Jun. 2007).

Srinivasa et al., "The Throughput Potential of Cognitive Radio: A Theoretical Perspective, " IEEE Communications Magazine, pp. 74-79 (May 2007).

Arslan et al., "Narrowband Interference Issues in Ultra Wideband Systems, " In Ultra Wideband Wireless Communications, Chapter 11, Arslan et al. (eds.) John Wiley & Sons, Inc.: Hoboken, NJ (2006).

Mao et al., "Semiblind Linear Parallel Interference Cancellation Multiuser Detectors for DS-CDMA Systems, " IEEE Transactions on Wireless Communications, vol. 4, No. 4, pp. 1319-1324 (2004).

Abd-El Aziz et al., "Performance Analysis of a Multistage Quasi-Orthogonal Minimum Output Energy Multiuser Detector for Turbo Coded CDMA Systems in Multipath Environment, " IEEE Vehicular Technology Conference, vol. 7, No. 60, pp. 749-753 (2004).

Elezabi, "Improved Viterbi Decode Metrics for Two-Stage Detectors in DS-CDMA Systems," IEEE Transactions on Wireless Communications, vol. 3, pp. 1399-1404 (2004).

Kafle et al., "Iterative Semi-Blind Multiuser Detection for Coded MC-CDMA Uplink System, "IEEE Transactions on Communications, vol. 51, No. 7, pp. 1034-1039 (2004).

Niekerk et al., "Blind Iterative MUD With Error Coding, " AFRICON 2004, vol. 1, pp. 179-184 (2004).

Schober et al., "Data-aided and Blind Stochastic Gradient Algorithims for Widely Linear MMSE MAI Suppression for DS-CDMA," IEEE Transactions on Signal Processing, vol. 52, No. 3, pp. 746-756 (Mar. 2004).

NTIA.FCCFrequency Allocation Chart, http://ntia.doc.gov/osmhome/allochrt.pdf (2003).

Federal Communications Commision, "Revision of Part 15 of the Commission's Rules Regarding Ultra-Wideband Transmission Systems, First Report and Order," Adopted Feb. 14, 2002 (Release Apr. 22, 2002).

Høst-Madsen, et al., "MMSE/PIC Multiuser Detection for DS/CDMA Systems with Inter- and Intra-cell Interference," IEEE Transactions on Communications, vol. 47, No. 2, pp. 291-299 (Feb. 1999).

3rd Generation Partnership Project (3GPP), "Technical Specification Group Radio Access Network; Physical Layer Procedures (TDD)," 3G TS 25.224, version 2.0.0 (Sep. 1999).

Honig et al., "Blind Adaptive Multiuser Detection, " IEEE Transactions on Information Theory, vol. 41, pp. 944-960 (Jul. 1995).

Varanasi et al., "Multistage Detection in Asynchronous Code-Division Multiple-Access Communications, " IEEE Transactions on Communications, vol. 38, pp. 509-519 (1990).

Lupas et al., "Linear Multiuser Detectors for Synchronous Code-Division Multiple Access Channels," IEEE Transactions on Information Theory, IT-35, pp. 123-136 (Jan. 1989).

* cited by examiner

METHODS, SYSTEMS, AND COMPUTER READABLE MEDIA FOR INTERFERENCE-MINIMIZING CODE ASSIGNMENT AND SYSTEM PARAMETER SELECTION FOR CODE DIVISION MULTIPLE ACCESS (CDMA) NETWORKS

PRIORITY CLAIM

The presently disclosed subject matter claims the benefit of U.S. Provisional Patent Application Ser. No. 61/291,349, filed Dec. 30, 2009; the disclosure of which is incorporated herein by reference in its entirety.

TECHNICAL FIELD

The subject matter disclosed herein relates to code assignment in multiple-access communication systems. In particular, the subject matter disclosed herein relates to methods and systems for interference-minimizing code assignment, bit epoch acquisition, and system parameter selection for code division multiple access (CDMA) networks.

BACKGROUND

A multiple-access communication system is a system in which multiple users can simultaneously communicate over the same channel. A code division multiple access (CDMA) system is a multiuser system in which signals of different users are spread over a wide frequency band using different spreading codes. The despreader in such a system uses the spreading code of each individual user to despread that user's signal and obtain the originally transmitted data.

The widespread acceptance of wireless technologies has triggered a huge demand for bandwidth that is expected to grow well into the future [1]. The traditional approach to ensure coexistence of diverse wireless systems is spectrum licensing. However, after many years of spectrum assignment to meet the ever increasing demand, the Federal Communications Commission's (FCC's) frequency allocation chart [2] now shows a heavily crowded spectrum with most frequency bands already assigned to different primary users for specific services. Cognitive radios have been proposed as a technology to allow secondary wireless devices to coexist with the primary users of the spectrum without disrupting the communications between them.

The underlay approach allows concurrent primary and secondary transmissions [1,3]. The underlay system for cognitive radio network was proposed using ultra wide band (UWB) signaling in [4,5]. CDMA systems with high spreading factors may also be considered as underlay networks. Underlay systems protect primary users by requiring the secondary signals to operate at transmit powers that result in interference levels that are below the acceptable noise floor for the primary users of the spectrum [6].

The opportunistic approach in cognitive radio is where spectrum sensing occurs followed by spectral allocation for transmission by secondary users in sub-bands that are perceived to be empty. The detection process suffers from both a probability of not detecting an active primary user or mistakenly marking a sub-band as occupied by a primary user. Furthermore, the spectrum sensing must continue periodically to detect the event of primary users arriving at, or leaving, the network. This requires dynamic re-allocation of spectrum and secondary users will regularly change their transmit frequencies, and reduces throughput due to the quiet periods required for sensing. Oftentimes, only highly fragmented bands are available. In [7], adaptively changing bandwidth and power of sub-bands in multi-carrier CDMA is proposed to improve performance, but the spectral map is assumed to be perfectly known to the secondary network.

The underlay approach may be advantageous over the opportunistic approach due to the above and particularly in some specific scenarios. For example, it is preferable if spectral conditions are changing very fast or the primary user is highly mobile. Its main disadvantage is the strict transmit power and large bandwidth spread requirements on the secondary users.

In CDMA systems, including those with underlay networks and those with only a single class of users, it is desirable to assign spreading codes to users in a manner that minimizes multiple access interference. It is also required to maintain service parameters, such as bit error rate, at an acceptable level. Accordingly, there exists a need for interference-minimizing code assignment and system parameter selection in CDMA networks.

SUMMARY

In accordance with this disclosure, methods, systems, and non-transitory computer readable media for interference-minimizing code assignment and system parameter selection in CDMA networks are disclosed.

A method for interference-minimizing spreading code assignment is disclosed. The method is performed at a base station or mobile station configured to operate in a code division multiple access (CDMA) radio network. We shall describe the method from the perspective of the base station which will assign, based on the method, spreading codes for uplink transmissions by users who will be served, or are already being served, by the base station. A mobile station executing the method, would request from its serving base station, or the base station that will serve it, that the base station use a particular spreading code on the downlink transmission to that mobile station. Henceforth, we shall describe the method as executed at the base station. The method includes receiving transmissions from user devices seeking to access the CDMA radio network. A spreading code is selected for a first user device seeking to access the network, using at least one cross-correlation parameter, to reduce multiple access interference between communications involving the first user device and other devices using the CDMA network.

A base station configured to operate in a code division multiple access (CDMA) radio network for interference-minimizing spreading code assignment is also disclosed. The base station includes a communications module for receiving transmissions from user devices seeking to access the CDMA radio network. An interference-minimizing code assignment (IMCA) module is configured to select, using at least one cross-correlation parameter, a spreading code for a first user device seeking to access the network to reduce multiple access interference between communications involving the first user device and other devices using the CDMA network.

The subject matter described herein for interference-minimizing code assignment and system parameter selection in CDMA networks may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

Preferred embodiments of the subject matter described herein will now be explained with reference to the accompanying drawings of which.

DETAILED DESCRIPTION

Improved systems and methods for interference-minimizing code assignment and system parameter selection in CDMA networks are disclosed herein.

Overview

In one exemplary implementation, a CDMA network in which the subject matter described herein may be operable includes a code-division multiple-access (CDMA) secondary network to operate cognitively as an underlay for a primary network. The interference-minimizing code assignment (IMCA) for secondary users described herein minimizes interference from existing primary and secondary users onto arriving secondary users. Furthermore, the interference from such arriving secondary users onto existing primary and secondary users is reduced. Moreover, IMCA may be used to re-assign spreading codes to existing secondary users if conditions change, e.g. locations and transmit powers of users change, or the set of active codes changes due to arrival and departure of users, both primary and secondary. IMCA is accomplished by minimizing the mean square cross-correlations between the candidate codes and the received signal. Since the codes of the primary CDMA network are unknown to the secondary network, the scheme may be said to operate blindly.

One advantage of the subject matter described herein includes significant performance gains compared to random code assignment (RCA).

According to one aspect, constraints on the user code space may be relaxed and a near-optimal solution may be obtained with complexity that is linear in the spreading factor.

According to the subject matter described herein, an underlay system using direct-sequence code-division multiple-access (DS-CDMA) is disclosed. For purposes of illustration, a CDMA signaling in both primary and secondary networks may be considered and equal spreading may be assumed in the derivations shown below. However, it may be appreciated that the subject matter described herein may be extensible to primary and secondary CDMA networks with unequal spreading factors and to other primary networks.

Assumptions

Figure 1:
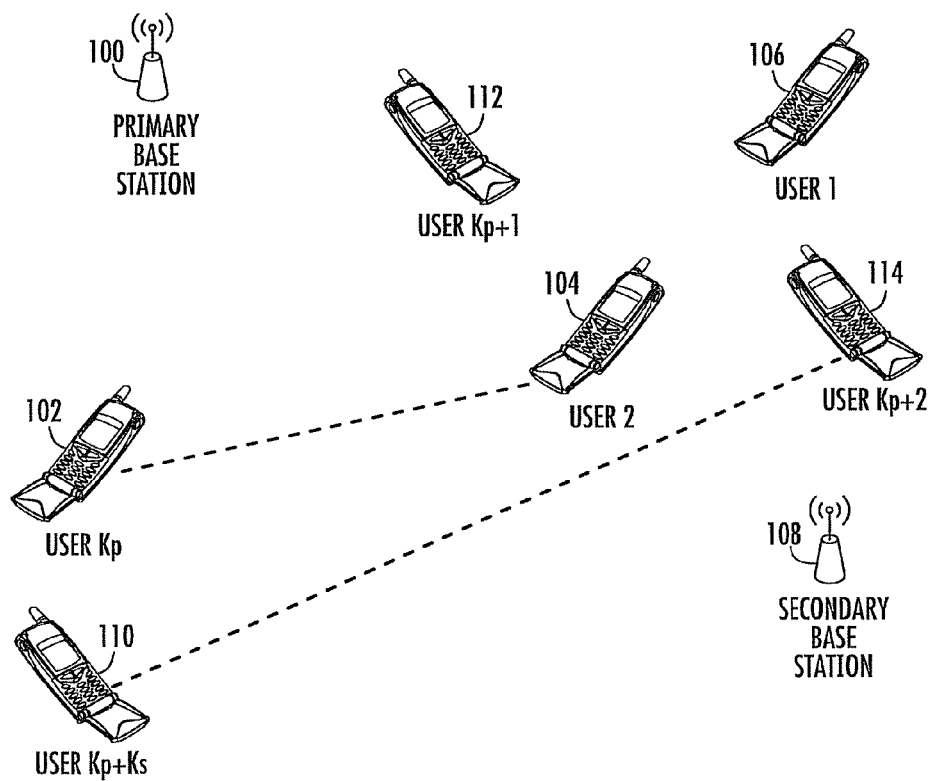
FIG. 1 is an exemplary cognitive network scenario suitable for performing interference-minimizing code assignment in CDMA networks according to an embodiment of the subject matter disclosed herein.
Figure 1:
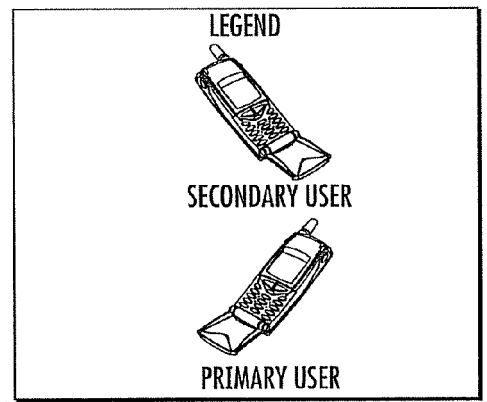

The basic premise of underlay systems is that the interference to the primary network is negligible by limiting the secondary network transmit powers. This may be compensated for by having lower data transmission rates and/or higher spreading factors for the secondary users. Hence, the interference problem we deal with is that from the primary to the secondary network as well as the multiple-access interference (MAI) within the secondary network itself. However, as mentioned earlier, the methods described herein result in further reducing the interference from the secondary network onto the primary network compared to random code assignment. In the initial problem formulation, we assume no information is passed from the primary network to the secondary network base station. However, we later show how such information, if available, may be used to advantage. This network structure is shown in FIG. 1.

In order to minimize the interference from the primary CDMA network, a cognitive method referred to as interference-minimizing code assignment (IMCA) for underlay secondary networks is disclosed. According to one aspect, spreading codes are assigned to each newly arriving secondary user such that the interference due to existing primary and secondary users experienced by that user is minimized. This may be accomplished by measuring the covariance matrix for the received signal from the existing primary and secondary user transmissions and selecting the code that minimizes the mean square cross-correlation between the received signal and the candidate codes.

Since the primary user spreading codes are unknown to the secondary network, a blind approach may be adopted and the problem may be formulated as a constrained minimization problem over the space of available codes. The complexity of such a search is exponential in the spreading factor, i.e. $O(2^N)$. It may then be possible to formulate a slightly relaxed constraint and obtain a much simpler problem whose complexity is $O(N)$ where N is the spreading factor in the secondary network. Fortunately, the performance using this near optimal method is found to be very close to that when using codes obtained from the exact solution. The performance gains due to IMCA measured in terms of error probability compared to random code assignment (RCA) are impressive.

It may be appreciated that, in addition to minimizing the effect of primary user transmissions on secondary users, the IMCA scheme described herein also reduces the interference caused by the secondary network onto the primary network. As a result, one advantage of the subject matter described herein includes higher throughput for the secondary network.

The comparison is between typical cognitive networks (e.g., spectrum sensing, radio, etc.), and the IMCA underlay network described.

One advantage of the subject matter described herein is that the IMCA scheme described herein does not suffer from sensing errors that result in either misallocated or underallocated spectrum. Furthermore, no dynamic re-assignment of spectrum is needed. Instead, the base station will re-assign an existing user with a new spreading code on an as-needed basis. This re-assignment is a simple baseband operation that does not require any change in the radio front end. Furthermore, the threshold for re-assigning a code is under the control of the secondary base station and is a 'soft' threshold that does not require immediate action on the part of the secondary network as, for example, in the case of vacating a channel due to the arrival of a primary user in opportunistic scheduling.

The IMCA scheme described herein may be applied for synchronous primary networks using short spreading codes and for asynchronous primary networks as well. For example, in UMTS cellular networks a short code option is available on the uplink and the IMCA scheme is directly applicable. Even with networks that use long cover codes, the IMCA is applicable after removing, i.e. de-spreading, the cover code. On the downlink, cellular standards, e.g. UMTS, use a pilot channel that transmits the cover code. This cover code is acquired by the mobile stations as a necessary step for subsequent communications. Since the downlink transmissions are synchronous, the cover code may be easily removed, and the IMCA scheme applied by the mobile station. In other cellular standards, there is a synchronous mode on the uplink, in which the base station sends periodic timing adjustments to the mobiles so that they maintain synchronization. In that case, the long cover code, if it exists, may be removed and the IMCA scheme applied.

System

FIG. 1 is an exemplary cognitive network scenario suitable for performing interference-minimizing code assignment in CDMA networks according to an embodiment of the subject matter disclosed herein. In a CDMA network architecture, there may be a primary network and a secondary underlay network. The basic premise of underlay networks is that the interference to the primary network is limited to acceptable values by limiting the network transmit powers of user devices operating in the secondary network (secondary users or secondary devices). This may be compensated for by having lower transmission rate and/or higher spreading factors for the secondary users. The subject matter described herein may be applied to primary and secondary CDMA networks with equal or unequal spreading factors and to other primary networks. In order to illustrate these various scenarios, FIG. 1 shows an infrastructure-based framework where a secondary base station applies interference mitigation techniques to improve secondary network capacity. It may be appreciated that unless otherwise noted, exemplary scenarios assume that no information is passes from the primary network to the secondary network base station. However, the interference mitigation techniques described in greater detail below may also be used when the secondary network does have some knowledge of the primary network without departing from the scope of the subject matter described herein.

Referring to FIG. 1, primary base station 100 may be responsible for providing wireless communications access to primary user devices to a CDMA network. Primary base station 100 may assign spreading codes and select system parameters in order to reduce multiple access interference between communications involving the first user device and other devices using the CDMA network. For example, base station 100 may serve primary user $K_p$ 102, user1 104, and user2 106. Secondary underlay network may be served by secondary base station 108 which may be geographically located in proximity to primary base station 100. Secondary base station 108 may be configured to provide similar functionality as primary base station 100 but taking into account transmissions by primary user devices 102-106 as well. Secondary base station 108 may be associated with secondary users $K_p+1$ 112, $K_p+2$ 114, through $K_p+K_s$ 110.

Figure 2:
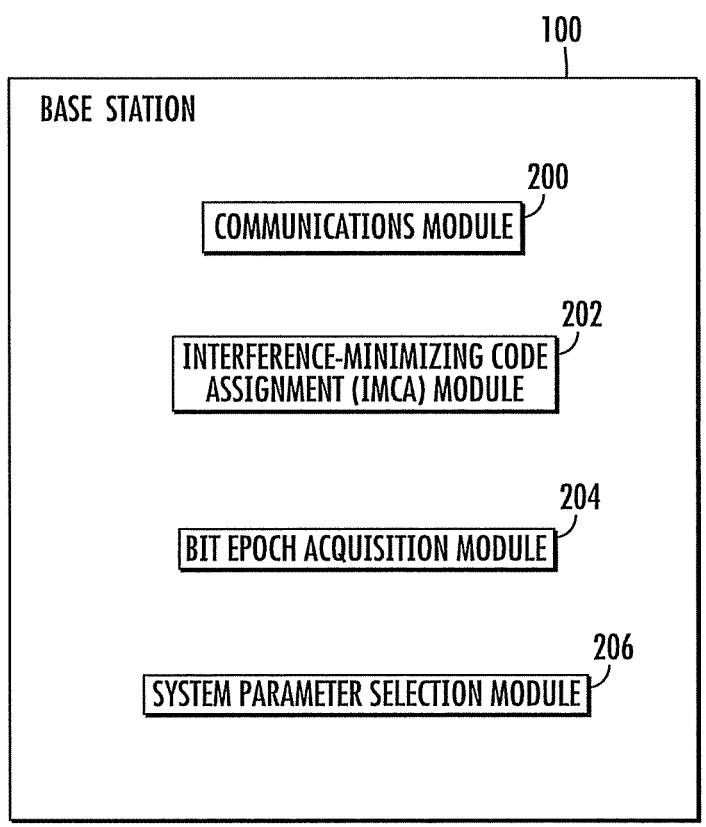
FIG. 2 is a block diagram of an exemplary receiver for performing interference-minimizing code assignment in CDMA networks according to an embodiment of the subject matter disclosed herein.

FIG. 2 is a block diagram of an exemplary receiver for performing interference-minimizing code assignment in CDMA networks according to an embodiment of the subject matter disclosed herein. Referring to FIG. 2, base station 100 may be configured to operate in a code division multiple access (CDMA) radio network for performing interference-minimizing spreading code assignment. Base station 100 may include a communications module 200 for receiving transmissions from user devices seeking to access the CDMA radio network. An interference-minimizing code assignment (IMCA) module 202 may be configured to select, using at least one cross-correlation parameter, a spreading code for a first user device seeking to access the network to reduce multiple access interference between communications involving the first user device and other devices using the CDMA network. Bit epoch acquisition module 204 may be configured to derive a bit or chip epoch if the network is either bit-synchronous or chip-synchronous. System parameter selection module 206 may be configured to adjust at least one system parameter of the first and at least one second user device to achieve a desired network performance parameter. The network performance parameter may include a bit error rate, which is often fixed to a maximum acceptable level by network operators. For example, system parameter selection module 206 may be configured to adjust at least one of a bit rate and a chip rate of user devices 102-106 and 110-114. User devices 102-106 and 110-114 may also belong to the same class or divided into multiple classes and system parameters may be selected on a per class basis. Thus, system parameter selection module 206 may be configured to adjust the system parameter for users within the same user class.

IMCA—Interference-Minimizing Code Assignment

As mentioned in the introduction underlay networks avoid some of the problems with spectrum sensing cognitive networks. In this section, we describe the IMCA scheme used for spreading code selection in the underlay CDMA network in order to achieve the goal of minimizing interference. Any arriving secondary user is assigned a spreading code such that the mean square cross-correlation between the received signal and that code is minimized. This is accomplished by minimizing an objective function subject to confining the codes elements (chips) to take values of ±1. For clarity, we start with the case of a single arriving secondary user with Kp active primary users then discuss the case of multiple secondary users.

IMCA—First Arriving Secondary User

Let the first arriving secondary user be user 1. Then we seek to assign user 1 an optimal spreading code $s_1$ where the optimality criterion is to minimize the average square cross-correlation between the spreading code $s_1$ and the received signal r. We consider Kp primary users and Ks secondary users transmitting bit-synchronously using binary CDMA signaling over a frequency-nonselective Rayleigh fading channel with additive white Gaussian noise. At any bit interval, the un-normalized received signal vector is given by $$r = \sum_{i=1}^{K_s} b_i c_i s_i + \sum_{j=K_s+1}^{K_s+K_p} b_j c_j s_j + n \quad (0.1)$$

where $c_j=|c_j|\exp(i\theta_j)$ is the complex Gaussian fading coefficient for user j, $b_j$ is the bit of user j($b_j=\pm 1$) using BPSK symbol, $s_j$ is the spreading code of user j with spreading factor equal to N, and n is the thermal Gaussian noise vector with distribution $N(0, N_0^2 I)$. All spreading codes are short codes that repeat every bit. With 1 sample per chip, the signal r is an (N×1) vector. Equation (1) can be alternatively represented in the following matrix format:

$$r=S_s C_s b_s = S_p C_p b_p + n \quad (0.2)$$

In the above equation, $S_s=[s_1 s_2 s_3 \ldots s_{K_s}]$ represents the matrix containing all the spreading codes of the secondary users, $C_s=\text{diag}([c_1 c_2 c_3 \ldots c_{K_s}])$ is the matrix for the fading coefficients of the secondary users, and $bs=[b_1\ b_2\ b_3\ \ldots\ b_{K_s}]$ is the vector of the secondary users' bits. The symbols $S_p$, $C_p$, and $b_p$ are defined similarly for the primary users. In particular, our objective is to find the cognitive secondary user code s1 that minimizes the following:

$$s1 = \underset{s1}{\text{argmin}}[E(|s_1^H r|^2)] = \underset{s1}{\text{argmin}}(s_1^H A s1) \quad (1)$$

where $s_1^H$ denotes the conjugate transpose of $s_1$ and A is the covariance matrix of the vector r defined earlier. The minimization is subject to the constraint that the individual component of $s_1$ takes the value ±1 or equivalently the individual components of the vector s1 should satisfy the following relation:

$$s_{1i}^2 = 1$$

for $$i=1,2,\ldots N \quad (2)$$

The process of finding the optimal code $s_1$ can be obtained using two different methods. The first one is to conduct an exhaustive search on all the possible values of the vector $s_1$ to find the optimal one. Although, this approach is useful in performing system simulations and assessing the performance, it is not yet practical in real implementation as it suffers from a complexity order that is exponential in N. The second method can be developed by formulating the problem as a Lagrangian optimization problem where the Lagrangian objective function to be minimized is given as follows:

$$J = s_1^H A s_1 + \sum_{i=1}^{N} \lambda_i (s_{1i}^2 - 1) \quad (3)$$

where λi are the Lagrangian multipliers. The code $s_1$ may then be obtained by applying the standard method of differentiating the Lagrangian function with respect to the individual components of $s_1$ and the Lagrangian multipliers λi. This results in 2N nonlinear equations that must be solved simultaneously to find the code. It is obvious that obtaining the optimal $s_1$ using this method is computationally tedious as it involves the solution of nonlinear equations. This is equivalent to the well-known problem of minimizing a quadratic Boolean form such as $s_1^H A s_1$. Some methods have been proposed for obtaining near-optimal solutions such as semi-definite programming [19] but they remain quite complex. There is a need to find an alternative method that can more efficiently find a near-optimal code $s_1$, that is, resulting in a near-minimum value for the quadratic form $s_1^H A s_1$.

IMCA—Near-Optimal Method for Code Assignment

A near-optimal method is developed that finds the vector $s_1$ that almost achieves the minimum mean square cross-correlation. This method depends on the observation that since the vector $s_1$ satisfies the relation (2) then subsequently the vector $s_1$ must satisfy the following:

$$s_1^H s_1 = N \quad (4)$$

Hence, rather than finding the optimal s1 vector whose elements obey the relations (11) we develop an optimization problem that finds the code $s_1$ and satisfies the single constraint (13). In particular, we find the code $s_1$ that minimizes the following Lagrangian function:

$$J = s_1^H A s_1 + \lambda(s_1^H s_1 - N) \quad (5)$$

Due to this relaxed constraint we have a single Lagrangian multiplier. It can be easily shown that the eigenvectors of the covariance matrix A minimize the above Lagrangian function where the Euclidean norms of the eigenvectors are scaled to satisfy the relation (4). However, the resulting eigenvectors may not satisfy the relation (2). Hence, we apply a hard limiter, sgn(.) function, to the eigenvectors to make them acceptable as spreading codes and then select from the among them the spreading code that minimizes the objective function J. Note that the number of eigenvectors available is at most N and therefore the search space is among N candidate spreading codes, that is, complexity O(N). It is clear that this method may not result in finding the same $s_1$ that results from solving the original optimization problem which is equivalent to what the exhaustive search would produce. However, as our simulation results show, the near-optimal method performance is very close to that of the optimal method in terms of bit error rates.

IMCA—Multiple Secondary Users

In the case of multiple existing secondary users in addition to $K_p$ existing primary users. There are two approaches to assigning the jth arriving secondary user. The first is to solve the same minimization problem of Equation (1) without changing the spreading codes assigned to the previous j−1 secondary users. Knowledge of the codes of those previous secondary users is available to the secondary network base station but is not needed explicitly since the received signal and the computed covariance matrix A includes the contributions of those secondary users. The second approach is to jointly re-assign all spreading codes for all previous j−1 secondary users whenever a user j arrives. The joint code assignment may be also be formulated as a relaxed Lagrangian optimization problem but its solution is somewhat tedious even while using the near-optimal approach as its complexity is O(Nj). The exhaustive method is of course prohibitive even for small N since the search space now contains $2^{Nj}$ vectors. Fortunately, we are able to show by simulations that the first approach where no re-assignment of secondary codes takes place for new secondary arrivals is near-optimal.

The above scenario assumes that the primary network conditions have not changed significantly until the arrival of the $j^{th}$ secondary user, i.e. the covariance matrix is almost the same. It should be noted that with mobility of users and the arrivals and departures of primary and secondary users, the covariance matrix due to primary and secondary users will change with time. This also means that re-assignment of secondary codes would be needed. This re-assignment may occur in several ways. For example, it may occur jointly as described above. In that case, knowledge of the secondary user may be used to carry out subtractive interference cancellation of the secondary user signals, then estimate the covariance matrix due to primary users only, and then jointly re-assign the secondary users' spreading codes. Another method would be to successively re-assign the secondary user codes. A reasonable criteria would be to select the worst-performing secondary user, based on estimation of its bit error rate, and re-assign it a new code using the IMCA method based on the latest update of the covariance matrix. The process may be repeated for as many secondary users as needed based on some criteria, e.g. their BER estimates.

Obtaining updates of the covariance matrix may be based on well-known methods in updating estimates of time-varying quantities. This means that updates of the covariance matrix will take less time than estimating it for the first time. Furthermore, another method to use knowledge of the secondary user codes may be to approximate the covariance matrix as the sum of two parts. The first part is due to the primary user transmissions and is estimated or update as described above. The second part is due to secondary user transmissions and is computed directly, not estimated, using knowledge of the secondary user codes, their timings, and estimates of received powers.

It may be appreciated that the above-described scenario for multiple secondary users may also be applied to multiple primary users in a single network (i.e., no secondary underlay network) without departing from the scope of the subject matter described herein.

IMCA—Simulation Results

A comparison of the error probability performance, with and without channel coding, of the IMCA and RCA schemes is shown. In all the simulation comparisons, we shall assume equal user SNR except for the coded case where we also include a case in which the primary users have higher SNR. As well, the spreading factors for both primary and secondary users are the same for convenience. For the uncoded case, the performance is averaged over an ensemble that varies from 20 to 100 randomly generated primary codes with 20,000 bits for each realization.

Figure 3:
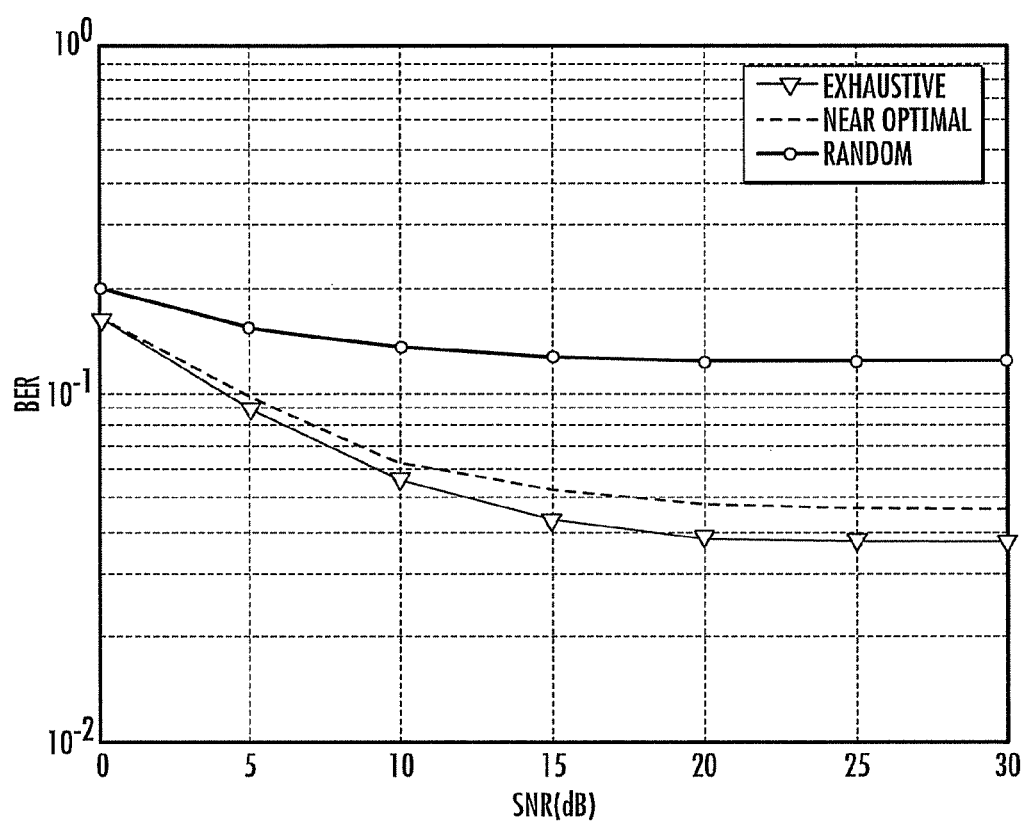
FIG. 3 is a diagram showing the performance of IMCA and RCA schemes using matched filter (MF) receiver in Rayleigh fading channel N=8, $K_p$=7, $K_s$=1 according to an embodiment of the subject matter disclosed herein.

FIG. 3 shows the uncoded BER for a single secondary user applying conventional matched filter detection with the proposed IMCA system compared to RCA on a Rayleigh fading channel. The number of primary users $K_p=7$, and the spreading factor N=8. The IMCA is obtained using the exhaustive and near-optimal methods. As shown in the figure, the performance of the IMCA method is significantly better than RCA method. The near optimal method gives performance that is very close to the optimum exhaustive search method.

Figure 4:
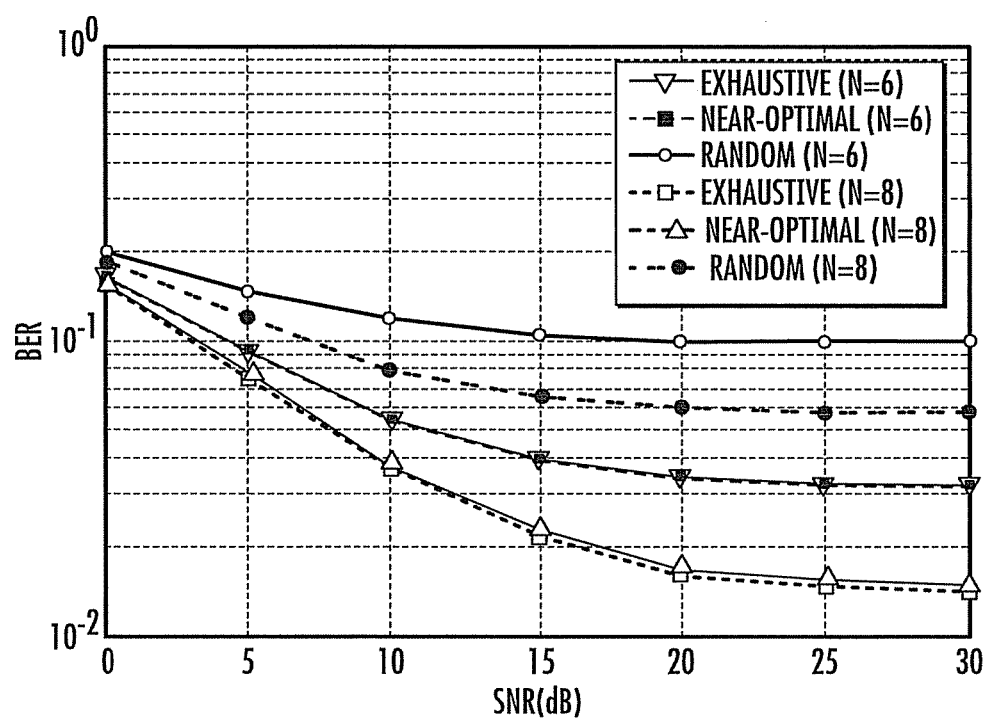
FIG. 4 is a diagram showing the performance of IMCA and RCA schemes using minimum output energy (MOE) receiver in Rayleigh fading channel N=6 (dotted), N=8 (solid), $K_p$=7, $K_s$=1 according to an embodiment of the subject matter disclosed herein.

FIG. 4 shows the same comparisons as FIG. 3 but using an MOE receiver instead of the matched filter. It is clear that the performance of the proposed IMCA scheme is again superior to that of RCA. The near-optimal method is almost identical to that of the optimum exhaustive code searching scheme. FIG. 4 also shows the performance for an overloaded system with spreading factor of N=6 and the same number of users. The proposed IMCA scheme still gives superior performance to RCA.

Figure 5:
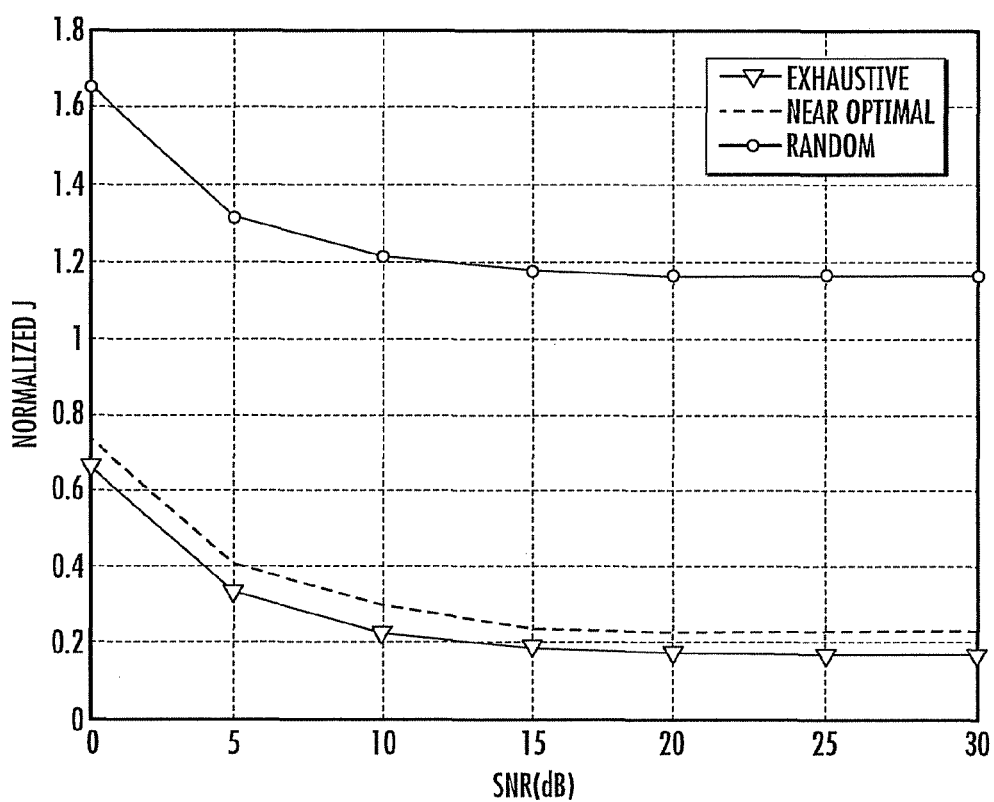
FIG. 5 is a diagram showing the normalized objective function J in Rayleigh fading channel N=8, $K_p$=7, $K_s$=1 according to an embodiment of the subject matter disclosed herein.

FIG. 5 illustrates the value of the normalized objective function J for the same parameters as in FIG. 3. It is an indication of the multiple access interference plus noise variance experienced by an arriving user using the assigned code for the different code assignment schemes. The IMCA system gives much better performance over the entire SNR range. Furthermore, the difference between the exhaustive and near-optimal schemes is very small, validating the IMCA as a near-optimal scheme.

Figure 6:
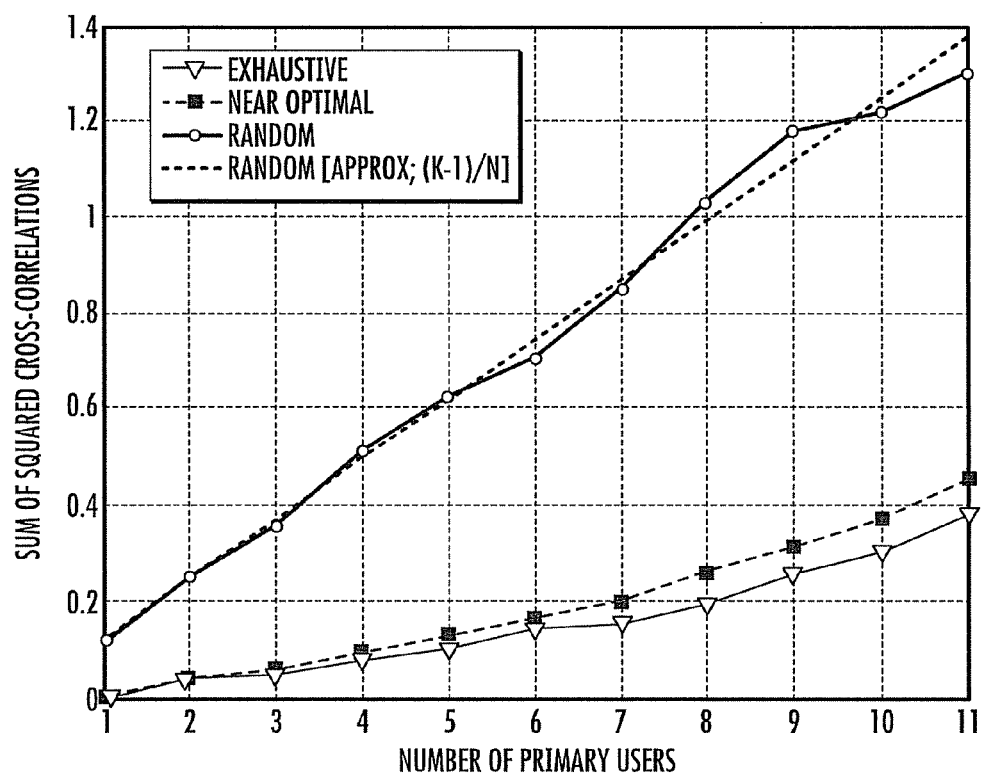
FIG. 6 is a diagram showing summation of squared cross-correlations of user 1 (secondary) against number of primary users in fading channels N=8 according to an embodiment of the subject matter disclosed herein.

FIG. 6 shows the summation of the squared cross-correlations (SSXC) between the assigned spreading code for user 1 (secondary) and the codes of all other primary users on a Rayleigh fading channel. There is a single secondary user, the spreading factor N=8, the SNR=10 dB and the number of primary users is varied from 1 to 11. Hence, the total number of users in the system varies from 2 to 12. The IMCA scheme results in significantly smaller SSXC than in the RCA schemes. Furthermore, the difference between the exhaustive and near-optimal schemes is insignificant even in overloaded networks, which again shows that the IMCA scheme results in very near-optimal code assignment. Note that the SSXC for the case of RCA may be computed analytically as $(K-1)/N$ using the standard Gaussian approximation where $K=K_p+K_s$ is the total number of primary and secondary users. The slope of the IMCA curve is less than the slope of the RCA curve which indicates the higher advantage with increasing the number of users. Finally, we investigate the performance of the IMCA when successively assigning several secondary codes.

Figure 7:
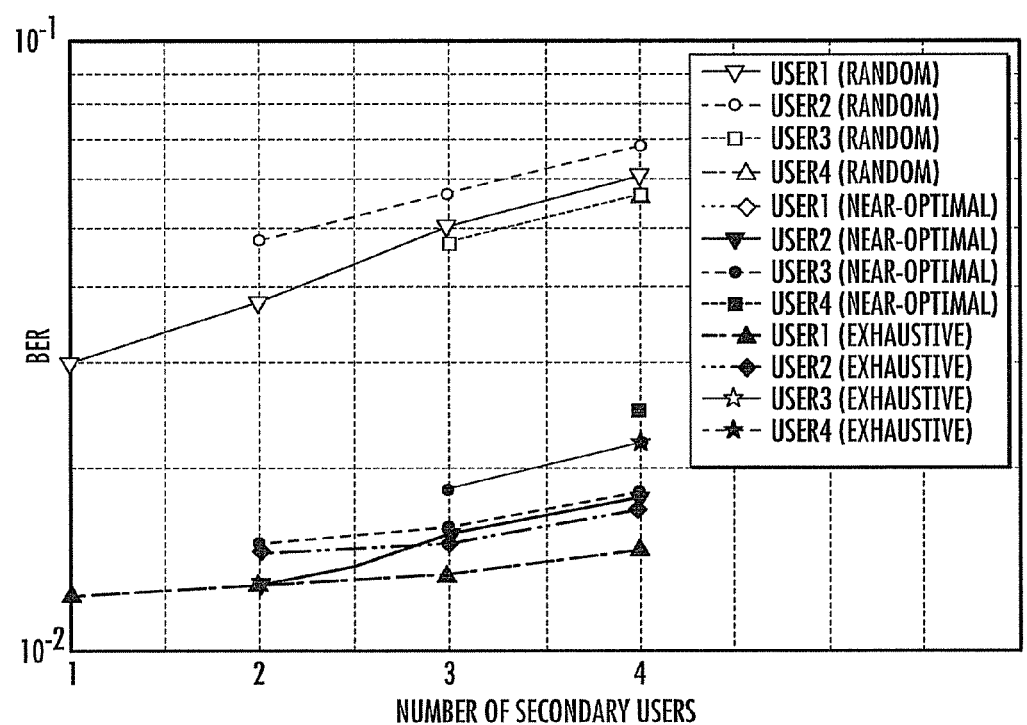
FIG. 7 is a diagram showing the performance of IMCA and RCA schemes for successively arriving secondary users using MOE receiver in Rayleigh fading channel N=8, $K_p$=4, SNR=10 dB according to an embodiment of the subject matter disclosed herein.

FIG. 7 shows the uncoded BER of each arriving secondary user as the number of secondary users is increased. The number of primary users $K_p$ is fixed at 4 and the spreading factor $N=8$ and the SNR=10 dB. We note that the performance of the IMCA is again clearly superior to the RCA scheme. Also, the slope of the BER curves is lower for the IMCA indicating the robustness of the IMCA for heavily loaded networks. More importantly, the BERs for all secondary users are similar indicating that secondary users are not significantly disadvantaged due to arriving early or late. It may be perceived that secondary users arriving later face a more constrained code assignment problem. While that is true by itself, secondary users arriving early will suffer from secondary users arriving later whose code assignments they, that is, the early users, do not determine. Fortunately, the code assignment exercised by secondary users arriving later results in codes that also have reduced cross-correlations from the perspective of the early users, both primary and secondary. Finally, in FIG. 7 the small increase in average BER with increasing number of secondary users from $K_s=1$ to 4 shows that the re-assignment of all secondary codes whenever a secondary user arrives will not lead to large improvements. Such a reassignment would involve added complexity. This is not to be confused with code re-assignment that would be needed due to changing conditions that would result in significant changes in the covariance matrix, as described earlier.

Figure 8:
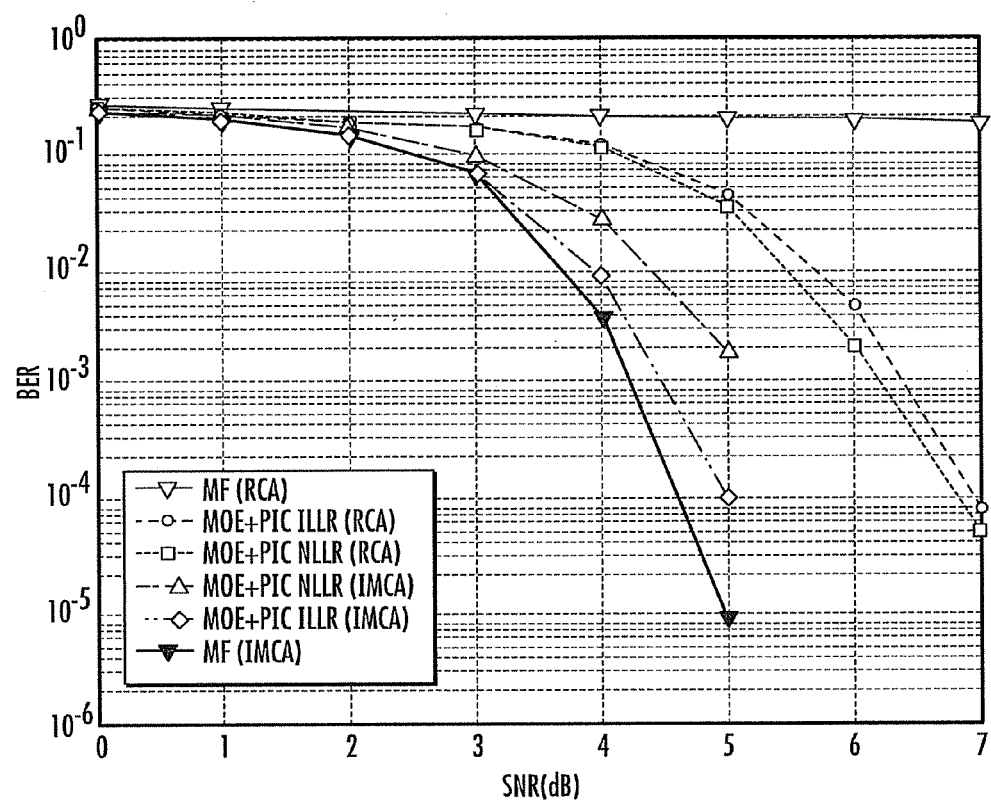
FIG. 8 is a diagram showing user1 performance with MOE+PIC in Rayleigh fading using improved log-likelihood ratio (ILLR) and noise LLR (NLLR) N=6, Kp=2, Ks=2, IMCA (exhaustive search) and a single random code assignment, where other users' SNR is 3 dB higher than user1 according to an embodiment of the subject matter disclosed herein.

In FIG. 8, we plot the performance for IMCA applied to user 1 and for a specific RCA with the following cross-correlation matrix $$R = \begin{bmatrix} 1 & 2/3 & 1/3 & 1/3 \\ 2/3 & 1 & 2/3 & 0 \\ 1/3 & 2/3 & 1 & 1/3 \\ 1/3 & 0 & 1/3 & 1 \end{bmatrix} \quad (6)$$

The parallel concatenated Turbo encoder of the UMTS standard is used with code rate ½ and using a random turbo inter-leaver of size 500. Five iterations internal to the Turbo decoder are used using the maxstar log-MAP decoder. The simulation is stopped after we obtain 100 errors from the lowest BER scheme. The improved LLR (ILLR) of (20) as well as the LLR used in [8], which assumes all MAI has been removed, are plotted. We call the latter BER curve noise LLR (NLLR) since it uses the noise term only in place of the variance of the RMAI plus noise. The performance advantage of the MOE is clear. There is not a significant difference between the performance of the ILLR and NLLR techniques, particularly in the RCA case. The IMCA scheme improves the performance significantly for both MOE plus parallel interference cancellation (PIC) and matched filter detectors. For the MOE plus PIC, a 2 dB gain in BER is achieved. For the matched filter, the gain is greater. This indicates that, with IMCA, conventional matched filter detection may be a viable option.

Asynchronous Multipath Fading Channels

A secondary CDMA network is proposed that operates as an underlay for an asynchronous primary CDMA network where the code assignment for the secondary network is done cognitively. We consider the different cases where the primary users are bit- and chip-synchronous, chip-synchronous but bit-asynchronous, and chip-asynchronous over multipath fading channels. We propose a method for blind epoch acquisition by processing the covariance matrix of the received signal. In all cases the performance improvement of the interference-minimizing code assignment over random code assignment is significant reaching over 3 dB for coded systems.

Introduction

We propose an interference-minimizing code assignment (IMCA) scheme for assigning spreading codes in asynchronous CDMA underlay networks. In this section, we extend the IMCA scheme to the case where knowledge of the primary user bit boundaries is unavailable. In particular, we devise a simple method for blind bit epoch acquisition of synchronous CDMA networks. Next, we consider chip-synchronous bit-asynchronous primary networks. We show that, while there is no primary users' bit epoch in this case, the same blind method may be used to identify the best bit epoch for each arriving secondary user. We then generalize the IMCA scheme for chip-asynchronous primary networks in multipath fading channels. Significant performance gains over the case of RCA are obtained in all cases. We find that RCA closely models practical CDMA system in asynchronous channels. This was verified using the short spreading codes of WCDMA in the TDD mode [23].

Bit-Asynchronous Model

We consider a CDMA-based cognitive network setting that involves a primary network and a secondary network composed of $K_p$ primary users and $K_s$ secondary users, respectively. The primary and secondary users transmit data concurrently using binary CDMA signaling. The secondary system can apply the IMCA scheme in a centralized or distributed manner. In our exposition of IMCA we shall first consider bit-asynchronous chip-synchronous networks over frequency non-selective Rayleigh fading channels corrupted with additive white Gaussian noise. In particular, for the chip-synchronous case the received signal after sampling with one sample per chip results in the following (Nx1) vector r whose $k^{th}$ element is given by $$r_k[j] = \sum_{i=1}^{K_s} b_{ik}[j]c_i[j]s_{ik}(m_i) + \sum_{i=K_s+1}^{K_s+K_p} b_{ik}[j]c_i[j]s_{ik}(m_i) + n_k \quad (7)$$

and $$b_{ik}[j] = \begin{cases} b_i[j-1] & k \leq m_i \\ b_i[j] & k > m_i \end{cases}$$

where $c_i=|c_i|1 \exp(j\theta_i)$ is the complex Gaussian fading coefficient for user i, $b_i$ is the bit of user i ($b_i=\pm 1$ for BPSK modulation), $b_{ik}$ is the bit of user i that affects the kth chip, $s_i$ is the spreading code of user i, j is the bit index and $n_k$ is the thermal AWGN signal with zero mean and variance $\sigma^2$. The variable $m_i$ denotes the number of the chips for user i shifted from the bit boundary of the user of interest and $S_{ik}(m_i)$ is the kth chip value of the spreading sequence $s_i$ when it is circularly shifted by $m_i$. Without loss of generality, we assume that the user of interest is the first secondary user indexed with i=1 whose corresponding $m_1$ is set to zero. We assume short spreading codes with processing gain N that repeat every bit. The receiver is the conventional matched filter where the received signal is correlated with the spreading code of the first secondary user $s_1$.

Bit Epoch Acquisition

The IMCA extension for synchronous primary networks where knowledge of the primary user bit boundaries is unavailable to the secondary network is described below. In that case, the matrix A is calculated for different, say N, possible bit boundaries. Let the candidate bit boundaries coincide with the chip offsets $kT_c$ where k=1, . . . , N. We then jointly search for the optimal code $s_1$ and the chip offset. Clearly, the complexity order is multiplied by a factor of N. The near-optimal code assignment approach may be performed in the same way. We calculate the matrix A for the different N candidate chip onsets and generate the N codes for each matrix A. Then we select the code $s_1$ that minimizes the objective function J.

To reduce the complexity we propose a method for obtaining the bit epoch by processing the matrix A at different chip offsets and then solving the Lagrangian problem once at the chosen bit epoch rather than N times. In particular, using equation (7) and the definition of the matrix A and assuming $E\{|c_1|^2\}=1$, the un-normalized diagonal elements of A maintain a constant value which can be expressed as follows $$a_{kk} = E\{r_k r_k^*\} = K_p + N\sigma^2 \qquad (8)$$

while the off-diagonal elements $a_{kn}$, where k and n are the matrix element indices, can be expressed as follows $$a_{kn} = E\{r_k r_k^*\} = \sum_{j=1}^{k_p}\sum_{i=1}^{k_p} E\{b_{jk}b_{in}\}s_{jk}s_{in} = \sum_{i=1}^{k_p}\{b_{ik}b_{in}\}s_{ik}s_{in} \qquad (9)$$

The final form of the equation can be found using the observation that $E\{b_{jk}b_{in}\}=0$ if $i \neq j$ because two bits of the two different users j and i are independent. Also, each off-diagonal element has a value that depends on the product of different spreading code chips and the term $E\{b_{ik}b_{in}\}$. In particular, the term $E\{b_{ik}b_{in}\}$ equals 0 if the two chips $s_{ik}$ and $s_{in}$ are affected by two different bits during the bit interval of observation. The same term equals one if the two chips are affected by the same bit.

In fact, for chip-synchronous primary users the off-diagonal elements may be obtained in terms of the chip offset d from an arbitrary observation bit boundary. The relationship can be illustrated using an example where we assume a single primary user. The spreading factor is 4 and the secondary network bit epoch has a chip offset equal to 2 chips relative to the primary user. Using equations (8) and (9), the resulting computation of the matrix A where we observe that the off-diagonal elements maintain non-zero values when both k and n are smaller than or equal to d or both k and 11 are greater than d. Hence, the off-diagonal elements can be represented in terms of the A matrix indices k and n, and the chip offset d as follows, $$a_{kn}\{d\} = \begin{cases} \sum_{i=1}^{k_p} s_{ik}s_{in} & ((k \& n) \leq d) \| ((k \& n) > d) \\ 0 & \text{otherwise} \end{cases} \qquad (10)$$

where & denotes the logical AND and || denotes the logical OR.

It is noted that in general for zero chip offset, all off-diagonal elements take non-zero values. To illustrate by a numerical example with multiple users, assume N=4 and $K_p$=3 with the spreading sequences of the synchronous primary users given by [1 −1 1 −1], [1 1 −1 1] and [−1 −1 1 1]. For convenience, assume $\sigma_{tot}^2=1$. The matrix A(d) as a function of the chip offset d is given by $$A(0) = \begin{bmatrix} 7 & 1 & -1 & -1 \\ 1 & 7 & -3 & 1 \\ -1 & -3 & 7 & -1 \\ -1 & 1 & -1 & 7 \end{bmatrix} \quad A(1) = \begin{bmatrix} 7 & 0 & 0 & 0 \\ 0 & 7 & 1 & -1 \\ 0 & 1 & 7 & -3 \\ 0 & -1 & -3 & 7 \end{bmatrix} \qquad (11)$$

$$A(2) = \begin{bmatrix} 7 & -1 & 0 & 0 \\ -1 & 7 & 0 & 0 \\ 0 & 0 & 7 & 1 \\ 0 & 0 & 1 & 7 \end{bmatrix} \quad A(3) = \begin{bmatrix} 7 & -1 & -1 & 0 \\ -1 & 7 & 1 & 0 \\ -1 & 1 & 7 & 0 \\ 0 & 0 & 0 & 7 \end{bmatrix}$$

As shown, the elements of A will include zeros only for non-zero chip offsets. Hence, the sum of the absolute values of the matrix elements will be maximum for zero chip offset. We therefore propose the following metric on A, also known as the elementary p-norm with p=1, to determine the correct bit epoch $$d_{opt} = \arg\max_d \left( \sum_{k=1}^{N}\sum_{n=1}^{N} |a_{kn}(d)| \right) \qquad (12)$$

where $d_{opt}$ is the shift from the arbitrary starting bit epoch of the secondary user and should coincide with the primary users' bit boundary.

After acquiring the bit boundary, the code assignment is performed according to the IMCA for synchronous networks. It should be noted that an implicit assumption in the above discussion is that the secondary network is chip-synchronous with the primary network. In the next section, we extend the IMCA technique for the more realistic chip-asynchronous networks.

IMCA for Asynchronous Primary Networks

Bit-Asynchronous Primary Users

For the bit-asynchronous chip-synchronous case we may solve the Lagrangian problem for N different chip offsets and select the code that minimizes the objective function among all chip offsets. However, we find that the same reduced complexity approach can be used, albeit with reduced accuracy. The method works because an element $a_{kn}$ equals zero if chips k and n belong to 2 different bits for all existing users as determined by the candidate observation epoch of the arriving secondary user. However, unlike in the synchronous case the elements of A(d) change for different shifts d because user chips can be affected by different bits for different shifts d. This slightly reduces the accuracy of bit epoch acquisition.

Chip-Asynchronous Primary Users

As the primary users are chip-asynchronous then in the secondary system the received signals is sampled with L samples per chip. The received vector r becomes an (NLxI) vector and the covariance matrix A becomes of dimension (NLxNL). By extension, both the exhaustive search and near-optimal methods may be applied NL times at all chip sample offsets. Note the hard limiting of the code samples is performed group-wise based on majority logic since all samples of a chip must have the same polarity. While the complexity is further multiplied by a factor of L the search space for selecting the spreading codes is larger which gives more degrees of freedom and better performance. Fortunately, to decrease the complexity, we can still use the same bit epoch acquisition scheme which gives reasonable accuracy based on the same arguments presented earlier.

IMCA in Multipath Fading Channels

Consider a multipath channel with P paths, each with a different power level and different delay for each of the primary and secondary users. A Rake receiver with P fingers using maximum ratio combining is applied. Two contradicting effects occur in this case. First, diversity gain is realized due to the combining effect. Secondly, the degrees of freedom in the code assignment are decreased due to the constraints imposed by the different paths of each user transmission.

The output signal from the matched filter for user 1 in any path l after phase compensation can be given by $$y_{1l} = b_1[j]|c_{1l}[j]| + \sum_{\substack{q=1 \\ q \neq l}}^{P} |c_{1q}[j]|\cos(\theta_{1l} - \theta_{1q})G_{1q}[j] + \sum_{i=2}^{K_s} \sum_{q=1}^{P} |c_{iq}[j]|\cos(\theta_{1l} - \theta_{iq})G_{iq}[j] + \sum_{i=K_s+1}^{K_s+K_p} \sum_{q=1}^{P} |c_{iq}[j]|\cos(\theta_{1l} - \theta_{iq})G_{iq}[j] + w_{1l}$$ (13)

and $$G_{iq}[j] = b_1[j-1]\sum_{k=1}^{m_{iq}} s_{lk}s_{ik}(m_{iq}) + b_i[j]\sum_{k=m_{iq}+1}^{N} s_{1k}s_{ik}(m_{iq})$$

where $c_{iq}[j] = |c_{iq}[j]|\exp(j\theta_{iq}[j])$ the complex Gaussian fading coefficient for user i for the jth bit interval in the path q, $m_{iq}$ is the shift between the spreading sequence of user 1 and the spreading sequence of user i for the qth path and $w_{1l}$ is the thermal noise term of user 1 in the path l. The output of the rake receiver over which the decision will be taken is $\gamma_1 = \Sigma_{l=1}^{P}\gamma_{1l}$. The interference term in the above equation contains a new component due to the self-interference from other paths of the user of interest.

Due to combining, the total interference affecting the final decision is due to all the P paths of the received signal. Based on equation (13), it may be shown that the objective function J becomes as follows $$J = \sum_{l=1}^{P} h_l J_l + s_1^H \left( \sum_{l=1}^{P} \sum_{\substack{q=1 \\ q \neq l}}^{P} h_l h_q B_{lq} \right) s_1$$ (14)

where $h_l$ is the fraction of the total user power in the l-th path i.e. $\Sigma_{l=1}^{P} h_l = 1$, $J_l$ is the objection function of the l-th path and $B_{lq} = E\{u_{1l}(d_{lq})^H\}$ is the delayed auto-covariance matrix between the transmitted signal of user 1 and a delayed version of it where $u_1 = b_1 c_1 s_1$. This delay $d_{lq}$ is the difference between the two delays of the paths l and q. The matrix $B_{lq}$ represents the self interference from the q-th path to the l-th path of user 1. Its elements can be calculated similar to equation (10) as follows $$b_{lq}(k, n) = \begin{cases} \{|s_1 s_1 (d_{lq})^h\}k, n & ((k \; \& n) \leq d_{lq}) || ((k \; \& n) > d_{lq}) \\ 0 & \text{otherwise} \end{cases}$$ (15)

The elements of $B_{lq}$ that equal zero are affected by different bit values in each observation interval.

The same approach for finding the optimal codes and bit epoch acquisition developed in the previous two sections can still be applied for the case of multipath fading channels. The only difference is using the modified objective function. As our simulations reveal, the near-optimal method achieves almost the same uncoded bit error probability attained by the exhaustive search.

Simulation Results

Figure 9:
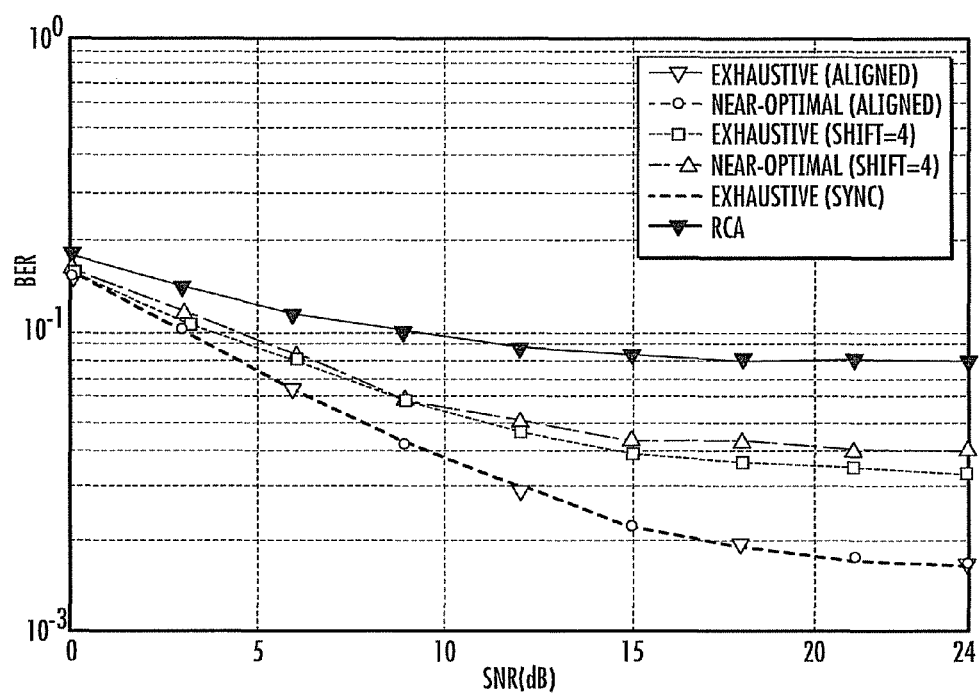
FIG. 9 is a diagram showing performance of the IMCA and RCA schemes using MF receiver in Rayleigh fading channel N=7, $K_p$=3, $K_s$=1 (synchronous primary users without knowledge of the bit boundary) according to an embodiment of the subject matter disclosed herein.

FIG. 9 shows the uncoded BER for a single secondary user of the proposed IMCA system compared to Random Code Assignment (RCA) on a Rayleigh fading channel without the knowledge of the bit boundary. Recall that RCA is the scheme where codes are assigned randomly to every new secondary user without any optimization. The primary users have Gold 7 spreading codes. The performance is averaged over an ensemble of 100 randomly generated secondary codes for RCA with 5,000 bits for each realization. In asynchronous primary users cases, the chip offsets between them are randomly generated uniformly distributed between 0 and one bit duration. The number of primary users is $K_p=3$, and the spreading factor is N=7. The number of samples per chip, L, for the chip-asynchronous case equals 4. For IMCA, the codes are assigned using the exhaustive and near-optimal methods.

As shown in FIG. 9, the performance of the IMCA scheme is significantly better than the RCA case. The near-optimal method gives performance that is very close to the optimum exhaustive method. The performance of the system after aligning the secondary users to the bit boundary is exactly the same as the synchronous system. It is clearly better than randomly selecting the bit boundary. The worst case is shown in the figure where the shift from the bit boundary is 4 chips.

Figure 10:
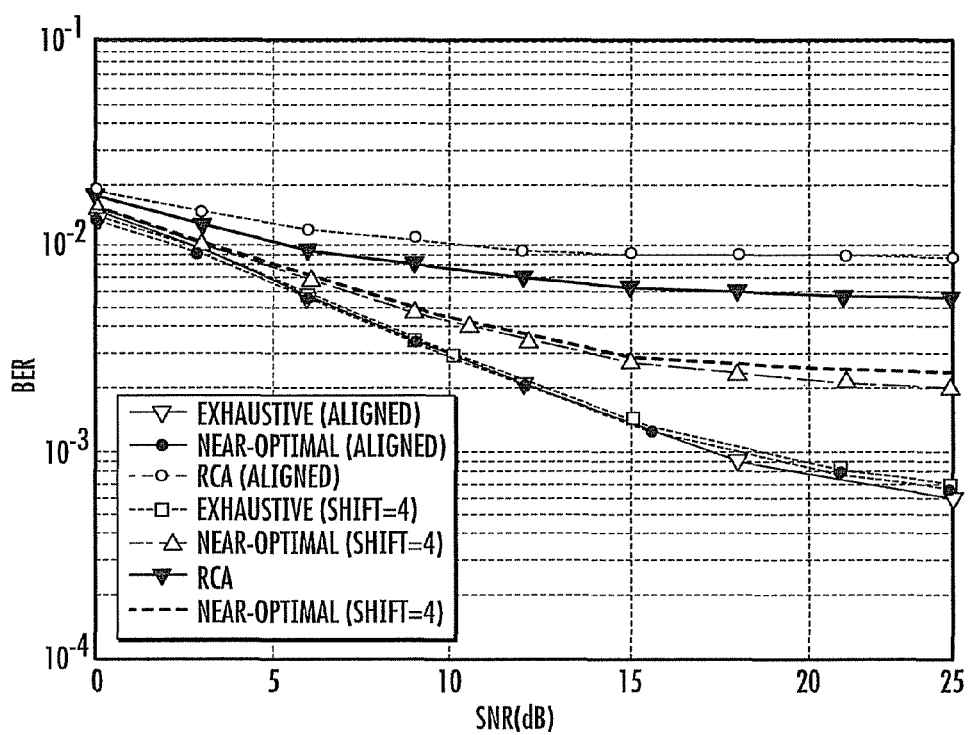
FIG. 10 is a diagram showing performance of the IMCA and RCA schemes using MF receiver in Rayleigh fading channel N=7, $K_p$=3, $K_s$=1 (bit- and ship-asynchronous primary users) according to an embodiment of the subject matter disclosed herein.

FIG. 10 shows the same trend as that of FIG. 9 but in this case the primary users are bit-asynchronous and chip-asynchronous. The IMCA still performs better than the RCA and the chip-asynchronous case has a better performance due to the larger search space and more degrees of freedom. The curve labeled Max-A indicates usage of the bit epoch acquisition for the bit-asynchronous case. It can be seen that the performance is virtually the same as applying the near-optimal method N times, for each chip offset.

Figure 11:
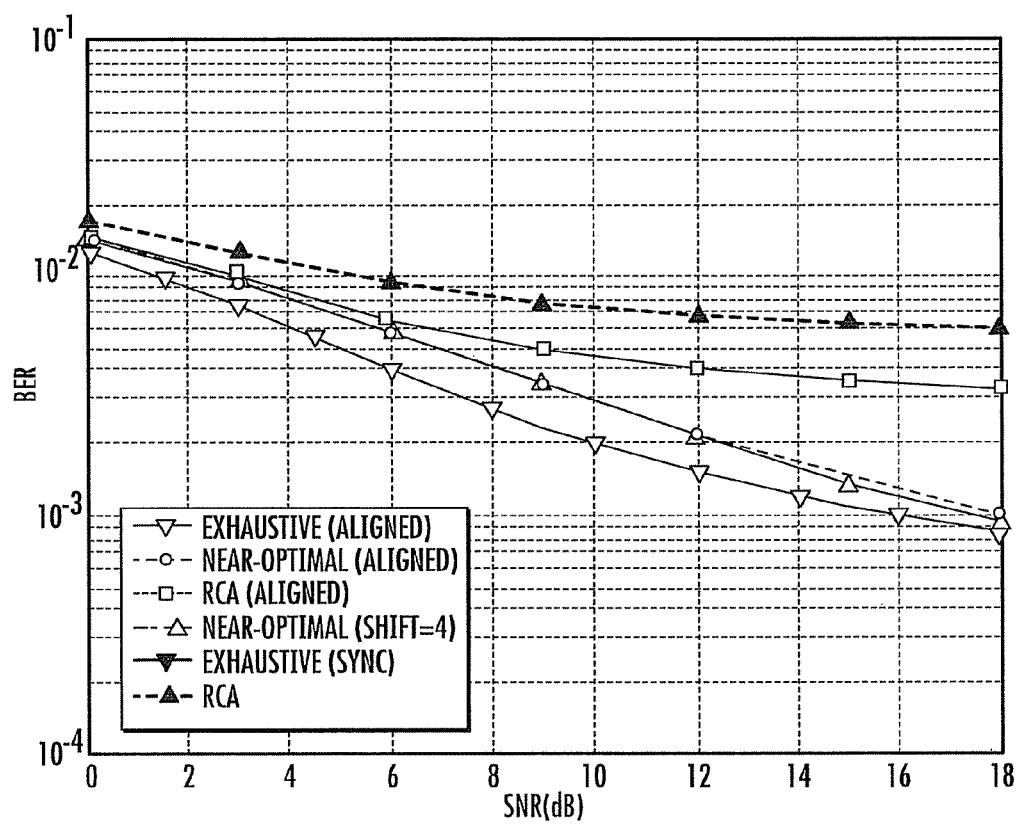
FIG. 11 is a diagram showing performance of the IMCA and RCA schemes using MF receiver in multipath Rayleigh fading channel N=7, $K_p$=3, $K_s$=1 (chip asynchronous primary users) according to an embodiment of the subject matter disclosed herein.

FIG. 11 shows the same trend as that of FIG. 9 but for the case of multipath fading channel. The multipath fading channel is a 2-path channel with equal power per tap and the separation between the paths is uniformly distributed from 0 to one bit duration. The primary users are chip asynchronous. The IMCA still performs better than the RCA and the two path case has a better performance due to the diversity gain despite the constraints imposed by the multiple paths.

Figure 12:
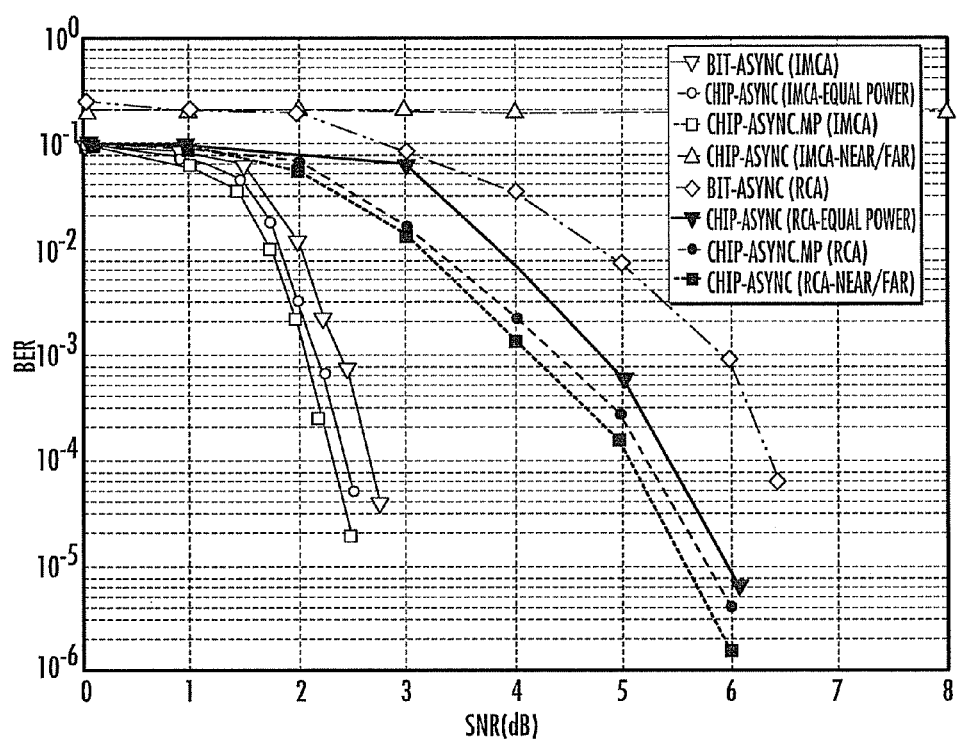
FIG. 12 is a diagram showing performance of the IMCA and RCA schemes using MF receiver in Rayleigh fading channel N=7, $K_p$=5, $K_s$=1 according to an embodiment of the subject matter disclosed herein.

FIG. 12 demonstrates the performance of the turbo-coded system with matched filter receiver. There is one secondary user and five primary users under 3 cases. The first case is when data transmitted by the primary users is bit-asynchronous and chip synchronous. The second case is when the data is bit-asynchronous and chip-asynchronous. The third case is when the data is bit-asynchronous and chip-asynchronous with multipath fading channel. We plot the BER of the secondary user. The parallel concatenated Turbo encoder of the UMTS standard is used with code rate ⅓ and using a random block interleaver of size 1000. The constraint length of the constituent codes is 4. Five iterations internal to the Turbo decoder are done using the max log-MAP decoder. For asynchronous cases, the chip offsets between the primary users are equally spaced during one bit duration. As shown, the IMCA scheme improves the performance significantly for this loaded system. It gives nearly a 3 dB gain in BER compared to the RCA case for bit-asynchronous primary users. It also gives nearly a 2 dB gain in BER compared to the RCA case for chip-asynchronous primary users.

FIG. 12 also shows the coded BER for a single secondary user under a near-far scenario. In the near-far case the 5 users have power levels that are 0 dB, ±5 dB and ±10 dB relative to the secondary user. As shown in the figure, the performance of the IMCA scheme is significantly better than RCA in the near-far case. This is because the IMCA is able to assign codes that result in less interference from the primary users with higher received power levels while deemphasizing primary users with low received power levels. In fact for the power profile chosen the RCA is unusable.

Conclusion

In summary, we propose the IMCA method for underlay CDMA networks with different synchronization scenarios. Comparisons with RCA in synchronous and asynchronous networks show significant performance gains reaching 3 dB for the coded case. We also develop a method for blindly identifying the bit epoch by maximizing the elementary p-norm of the correlation matrix A that offers near perfect accuracy for synchronous primary networks. The method is also applicable to asynchronous primary networks where the target in this case is the best chip sample offset for the arriving secondary user code since no single bit epoch exists in that case. We note that while power control is an essential part of most CDMA systems, the received power levels from primary users will be uncoordinated at the secondary network base station except if it physically located with the primary base station.

It should be pointed out that in an underlay system, the secondary users should have a power spectral density below the noise floor of the primary network. With equal bit rates, this will imply a higher chip rate and higher spreading factor for the secondary network. Extending our methods to that case is straightforward. In fact, the IMCA scheme will enjoy higher degrees of freedom, and the complexity increase is only linear in the spreading factor. The selection of secondary network parameters, e.g., spreading factor, is studied in [24]. Also, the code assignment problem may be solved jointly with the power allocation. Finally, the MAI plus noise variance may be computed analytically in terms of the eigenvalues for the case of IMCA scheme and used to give an approximate indication of the BER.

System Parameter Selection for Asymmetric Underlay CDMA Networks with Interference-Minimizing Code Assignment Next, a framework is presented for selecting the secondary system parameters that achieves a required BER performance under the constraint of achieving a PSD level acceptable to the primary network. We have shown that the IMCA achieves higher throughput compared to the RCA given the same BER performance.

A framework is proposed for designing an underlay secondary CDMA network. The objective is to select the secondary system's bit rate and spreading factor that improve the secondary network throughput given a required bit error rate and an allowable transmit power level acceptable to the primary network. The selection scheme is applied to both the case of random code assignment and an interference-minimizing code assignment (IMCA) scheme. Our simulations reveal that the parameter selection for the system with interference-minimizing code assignment scheme leads to higher system throughput over that achieved with random code assignment. We also show that the IMCA scheme, unlike random code assignment, suffers negligible interference from adjacent bands in asynchronous channels.

System Parameter Selection—Introduction

The underlay approach in cognitive radio allows concurrent primary and secondary transmissions [1,3] and was proposed for cognitive radio networks using Ultra Wide Band (UWB) signaling in [4,5]. Underlay systems protect primary users by requiring the secondary signals to operate at transmit powers that result in interference levels that are below the acceptable noise floor for the primary users of the spectrum [6]. Underlay networks offer several advantages over alternative approaches in cognitive networks [1]. However, they tend to be conservative in transmit power assignment. In [22], we proposed an interference-minimizing code assignment (IMCA) scheme for underlay CDMA networks that minimizes interference from primary users and existing secondary users. The idea of IMCA is based on selecting the code that minimizes the mean square cross-correlation between the received signal and the candidate codes subject to code constraints. The performance improvement of the interference-minimizing code assignment over random code assignment was significant reaching about 3 dB for coded systems. In [30], the scheme was extended to asynchronous networks in multipath fading channels.

In this section we propose a method for the selection of the secondary system parameters that improves the overall system throughput for a given bit error rate performance. In particular, the selection of the secondary system's chip rate and bit rate are carried out such that the Power Spectral Density (PSD) of the secondary system is maintained below the primary network's acceptable interference threshold. This results in a secondary system with variable spreading factor. In finding the secondary system parameters, we first consider the case where the bandwidth occupancy, i.e. the chip rate, of the secondary network is larger than that of the primary network. Such a case allows for lower PSD level but also leads to other adjacent primary CDMA channels interfering with the secondary users. We present a performance analysis for the effect of the interference from multiple adjacent primary users on the secondary users and their effect on the IMCA scheme. Our analysis and simulations reveal that the effect of these adjacent primary users on the performance of the secondary network is negligible using the IMCA scheme. We then present a framework for selecting the secondary system parameters for a certain chip rate selected based on the available bandwidth. As our simulations reveal, for the obtained system parameters, the secondary system network achieves higher overall throughput for the IMCA criterion compared to the random code assignment (RCA) given the same bit error rate performance requirement.

System Parameter Selection—System Model and Problem Formulation

Consider a CDMA-based cognitive network setting that involves a primary network and a secondary network composed of $K_p$ primary users and $K_s$ secondary users, respectively. The primary and secondary users transmit data concurrently using binary CDMA signaling. We consider chip-asynchronous networks over frequency non-selective Rayleigh fading channels corrupted with additive white Gaussian noise. The received signal at any time instant t, is given by $$r(t) = \sum_{i=1}^{K_s} b_i(t)c_i(t)s_i(t-T_i) + \sum_{i=K_s+1}^{K_s+K_p} b_i(t)c_i(t)s_i(t-T_i) + n(t) \quad (16)$$

where $c_i = |c_i|\exp(j\theta_i)$ is the complex Gaussian fading coefficient for user i, $b_1$ is the bit of user i ($b_1 = \pm 1$ for BPSK modulation), $s_i$ is the spreading code of user i and n(t) is the thermal AWGN signal with zero mean and variance $v^2$. The variable $T_i$, denotes the time for user i shifted from the bit boundary of the user of interest.

Without loss of generality, we assume that the user of interest is the first secondary user indexed with i=1 whose corresponding $T_i$ is set to zero. We assume short spreading codes for both primary and secondary users with primary users' processing gain $N_p$ and secondary users' processing gain $N_s$ that repeat every bit. Sampling the signal r(t) with m sample per secondary user chip results in the following ($mN_s \times 1$) vector r which represents the $j^{th}$ bit period and whose $k^{th}$ element is given by $$r_k[j] = \sum_{i=1}^{K_s} b_{ik}[j]c_i[j]s_{ik}(T_i) + \sum_{i=K_s+1}^{K_s+K_p} b_{ik}[j]c_i[j]s_{ik}(T_i) + n_k \quad (17)$$

where $S_{ik}(T_i)$ is the $k^{th}$ sample value of the spreading sequence $s_i$ when it is circularly shifted by $T_i$ and $b_{ik}$ is the bit of user i that affects the $k^{th}$ sample. The receiver is the conventional matched filter where the received signal is correlated with the spreading code of the first secondary user $S_1$. The PSD of the primary and secondary users are given as follows, $$S_P = \frac{E_{bp}R_{bp}}{R_{cp}} \quad (18)$$

$$S_s = \frac{E_{bs}R_{bs}}{R_{cs}}$$

where $E_{bp}$ is the primary user bit energy, $R_{bp}$ is the primary user bit rate, $R_{cp}$ is the primary user chip rate, $E_{bs}$ is the secondary user bit energy, $R_{bs}$ is the secondary user bit rate and $R_{bs}$ is the secondary user chip rate. We assume that the $K_p$ primary users have equal $E_{bp}$, $R_{bp}$ and $R_{cp}$ and similarly for the secondary users. The spreading factor of the primary user is $N_p = R_{bp}/R_{bp}$ and for the secondary user is $N_s = R_{cs}/R_{bs}$.

Based on equation (17), the SINR $\gamma$ for the secondary user of interest may be approximated as follows $$\gamma = \frac{E_{bs}}{(K_s - 1)E_{bs}X_s + K_pE_{bp}X_p + \sigma^2} \quad (19)$$

where $X_s$ is the expected value of the cross correlation between the secondary users' spreading codes given by $E\{S_i^H S_k\}$ where $i,k = 1, 2, \ldots K_s$ and $X_p$ is the expected value of the cross correlation between the secondary users' spreading codes and the primary ones given by $E\{S_i^H S_k\}$ where $i=1, 2, \ldots K_s$ and $k = K_s+1, K_s+2, \ldots K_s+K_p$.

Our main objective is to select $R_{cs}$, $R_{bs}$ and $E_{bs}$ of the secondary system that achieve a required bit error or equivalently a required SINR under the constraint that the sum of the PSD levels of the secondary users is below a predetermined fraction of the power PSD of the primary user. This is expressed as $$\sum_{i=1}^{K_s} S_{si} = \frac{1}{\beta}S_p \quad (20)$$

where $\beta$ is the ratio between the total PSD of the secondary system to the PSD of a primary user.

System Parameter Selection—IMCA with Higher Chip Rate

In this section we present a performance analysis for the effect of IMCA method given higher secondary chip rates compared to the primary ones. We show that increasing the secondary chip rates results in a minimal interference effect on the secondary system. Then, in the next section, we show how to select the secondary system parameters.

For simplicity and without loss of generality, we consider that the $K_p$ primary users are all transmitting on a carrier different from the secondary user carrier by $\overline{\omega}\circ$. The bandwidth of CDMA systems is approximated to be equal the chip rate. As a result, the bandwidth of the primary system transmission is $R_{cp}$ so that the value of $\overline{\omega}\circ$ is higher than or equal $R_{cp}$. The received signal in this situation can be defined as follows $$r(t) = \sum_{i=1}^{K_s} b_i(t)c_i(t)s_i(t-T_i) + \sum_{i=K_s+1}^{K_s+K_p} b_i(t)c_i(t)s_i(t-T_i)co(s\varpi \circ t) + n(t) \quad (21)$$

The received signal is then sampled as (17) and the vector r can be given by $$r_k[j] = \sum_{i=1}^{K_s} b_{ik}[j]c_i[j]s_{ik}(T_i) + \sum_{i=K_s+1}^{K_s+K_p} b_{ik}[j]c_i[j]s_{ik}(T_i)co(s\varpi \circ [jmN_s + k]) + n_k \quad (22)$$

The Multiple Access Interference (MAI) from the primary users can be written as follows $$MAI_{pri} = K_p E_{bp} E\left\{\sum_{k=1}^{mN_s} s_{1k} s_{ik} \cos(\varpi \circ [jmN_s + k])\right\} \quad (23)$$

The summation inside the expectation determines the value of the primary MAI. In the synchronous case where $\overline{\omega}\circ$ at least equals $R_{cp}$ every chip period spans at least one period of the sinusoidal term inside the summation. Hence, during one chip period, the summation is formed of samples of a complete period or more of the sinusoidal. So the summation will be equivalent to averaging over one period of the sinusoid and hence it will be almost equal to zero. As a result, the interference values will be minimal. In the asynchronous case, the primary users' chip edges are different resulting in each chip period having more than a single value. In this case, the MAI term will not be equal to zero as the samples of the sinusoidal averaged over one period will have different values. Hence, the resulting MAI for the asynchronous case will be higher than that compared to the synchronous case. However, as will be shown later in the simulation section, the IMCA can handle this problem compared to the RCA scheme due to the fact that the IMCA selects the code that minimizes the interference. In fact, the IMCA scheme benefits from increasing the chip rate that results in increasing the spreading factor and hence adding more degrees of freedom for the IMCA scheme to select better codes.

Secondary System Parameters Selection

Consider the case of primary system with parameters $R_{cp}$, $R_{bp}$, $E_{bp}$, $K_p$ and $N_p$ having assumed values. The secondary system parameters $R_{cs}$, $R_{bs}$ and $E_{bs}$ are to be selected. Above, we have shown that increasing the chip rate will enhance the performance. Therefore, minimizing the PSD of the secondary system by decreasing $R_{cs}$ has no limitation except the available bandwidth of the underlay system. Next, we consider a constant chip rate $R_{cs}$ which is an integer multiple of $R_{cp}$ such that it covers all the bandwidth available for the underlay system. Based on the assumption that all the users have identical parameters, maximizing the overall system throughput is equivalent to maximize the throughput per user. Therefore, without loss of generality, we assume the number of the available secondary users $K_s$ is constant.

The main goal is to find the optimal throughput $R_b$ per user that satisfies a required bit error rate or equivalently a required SINR under the power constraint developed in (20). The solution for this problem can be determined by solving equation (20) jointly with maintaining equation (19) at a certain value to find the optimal $R_b$. In particular, for the simple case of the RCA, and using the relation that the expected value of the cross correlation is $1/N_s$ and the two equations can be written as follows:

$$\frac{k_s E_{bs} R_{bs}}{R_{cs}} = \frac{1}{\beta} \frac{E_{bp} R_{bp}}{R_{cp}} \quad (24)$$

$$\frac{E_{bp}}{(K_s - 1)E_{bp}/N_p + K_p E_{bp}/N_p + \sigma^2} = \frac{E_{bs}}{(K_s - 1)E_{bs}/N_s + K_p E_{bp}/N_s + \sigma^2} \quad (25)$$

The above equations can be used to determine the optimal values of bit rate and bit energy.

The total system throughput is given by $K_s R_{bs}$. The throughput is maximized by maximization of $K_s$ and $R_{bs}$. We can maximize the throughput under the above two conditions. In this paper we consider the case of constant number of secondary users $K_s$. So the throughput maximization reduces to solving the two conditions simultaneously to get the solution for the bit rate. For the IMCA scheme, the same equations could be used but the main difference will be in determining the cross correlation value. These values could be measured experimentally using the system parameters. The primary interference could be calculated if the parameters $k_p$, $E_{bp}$ and $N_p$) are known by the secondary system or measured by sensing the received vector r.

It is noted that the IMCA scheme would result in a better bit rate compared to the RCA. This is mainly due to increasing the chip rate by a certain ratio over the primary system bandwidth permits the PSD of the secondary to decrease by the same ratio for at least the same SINR. The performance should be better as increasing the spread factor leads to less MAI. In case of IMCA scheme, increasing the spread factor leads to more degrees of freedom in spreading code selection. To benefit from this enhancement of the performance, we can increase the bit rate while maintaining the required performance. In the next section, we show using simulations that the IMCA scheme achieves higher throughput at the same bit error rate compared to the RCA.

Secondary System Parameters Selection—Simulation Results

Consider the uncoded BER for a single secondary user of the proposed IMCA system compared to Random Code Assignment (RCA) on a Rayleigh fading channel. RCA is the scheme where codes are assigned randomly to every new secondary user without any optimization. The primary users have Gold 7 spreading codes. The performance is averaged over an ensemble of 100 randomly generated secondary codes for RCA with 5,000 bits for each realization. In asynchronous primary users cases, the chip offsets between them are randomly generated uniformly distributed between zero and bit duration. The spreading factor is N=7. The number of samples per chip, L, for the chip-asynchronous case equals 4.

Figure 13:
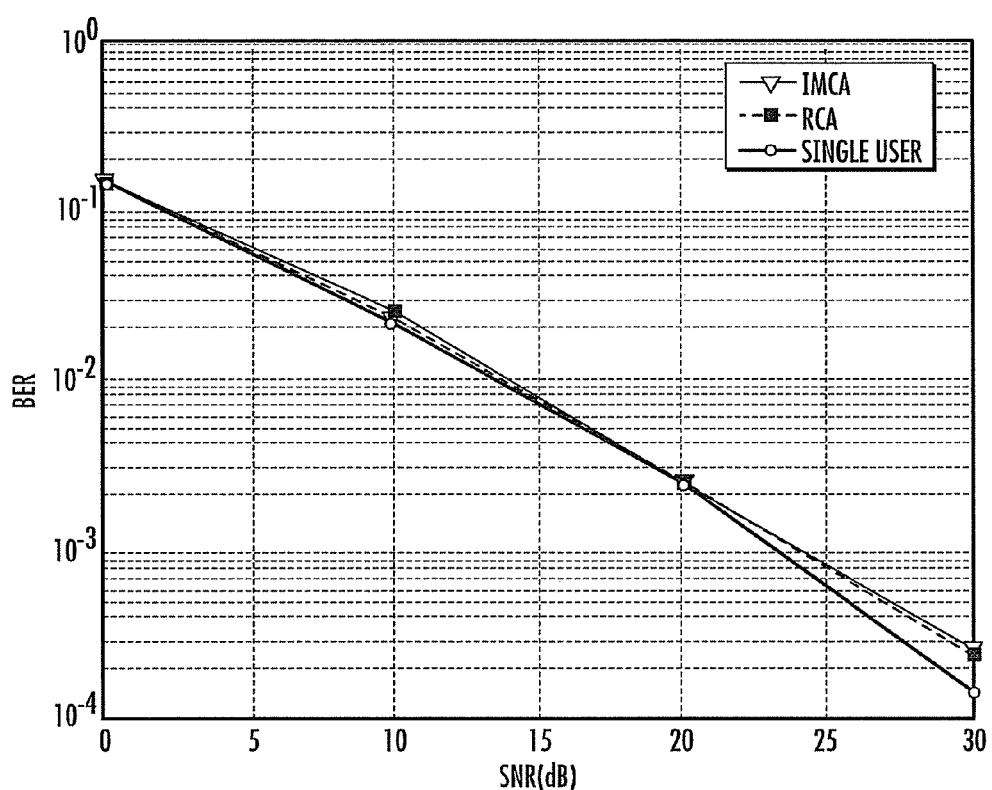
FIG. 13 is a diagram showing performance of the IMCA and RCA schemes using MF receiver in Rayleigh fading channel N=7, $K_p$=3, $K_s$=1 (synchronous primary user with a carrier different by $R_{cp}$ from the secondary system) according to an embodiment of the subject matter disclosed herein.

FIG. 13 shows the BER of a single secondary user when the primary system users are sent with a carrier different from the secondary system carrier by $R_{cp}$. The number of primary users is $K_p$=3. The BER of a single user is also considered. As shown in the figure, the performance of the secondary users is nearly as the single user performance as there is one complete period of the sinusoidal in the chip duration.

Figure 14:
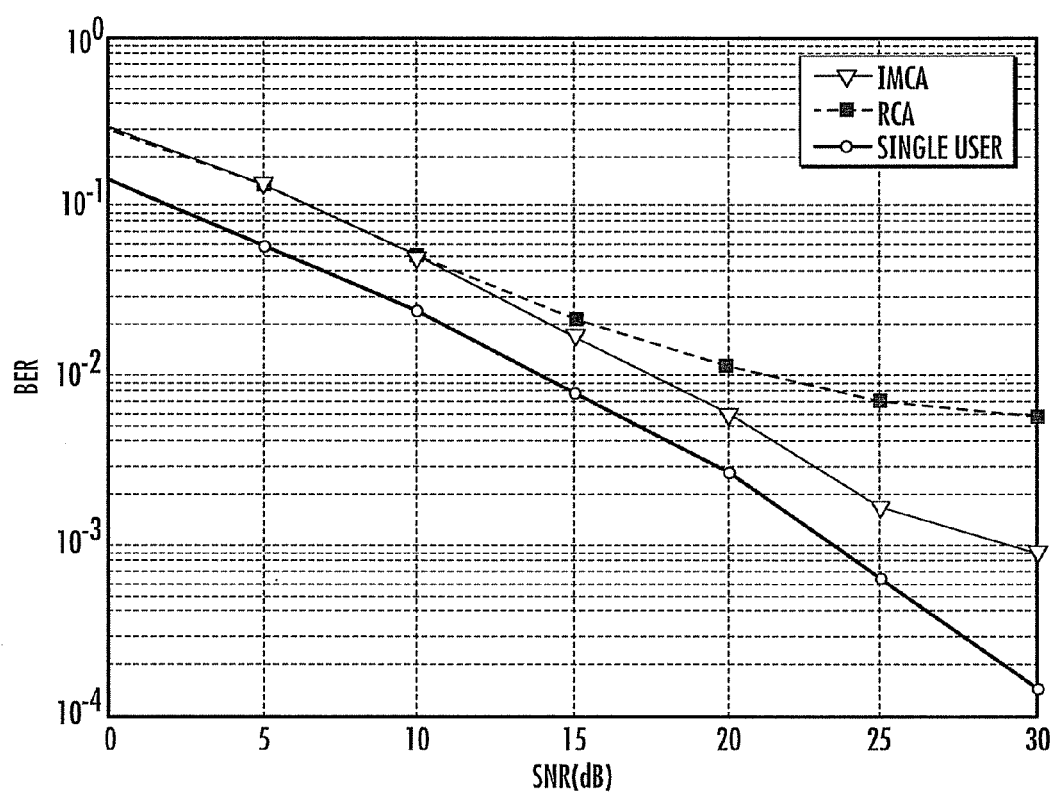
FIG. 14 is a diagram showing performance of the IMCA and RCA schemes using MF receiver in Rayleigh fading channel N=7, $K_p$=3, $K_s$=1 (asynchronous primary user with a carrier different by $R_{cp}$ from the secondary system) according to an embodiment of the subject matter disclosed herein.

FIG. 14 shows the BER of a single secondary user when the primary system users are sent with a carrier different from the secondary system carrier by $R_{cp}$. In addition, the primary users are chip-asynchronous. As shown in the figure, the performance of the secondary users using IMCA is better than that achieved by using RCA scheme especially at high SNR values. In the asynchronous case, the chip edges are not synchronized so there is a small MAI affecting the secondary system. This effect is eliminated by the IMCA scheme.

Figure 15:
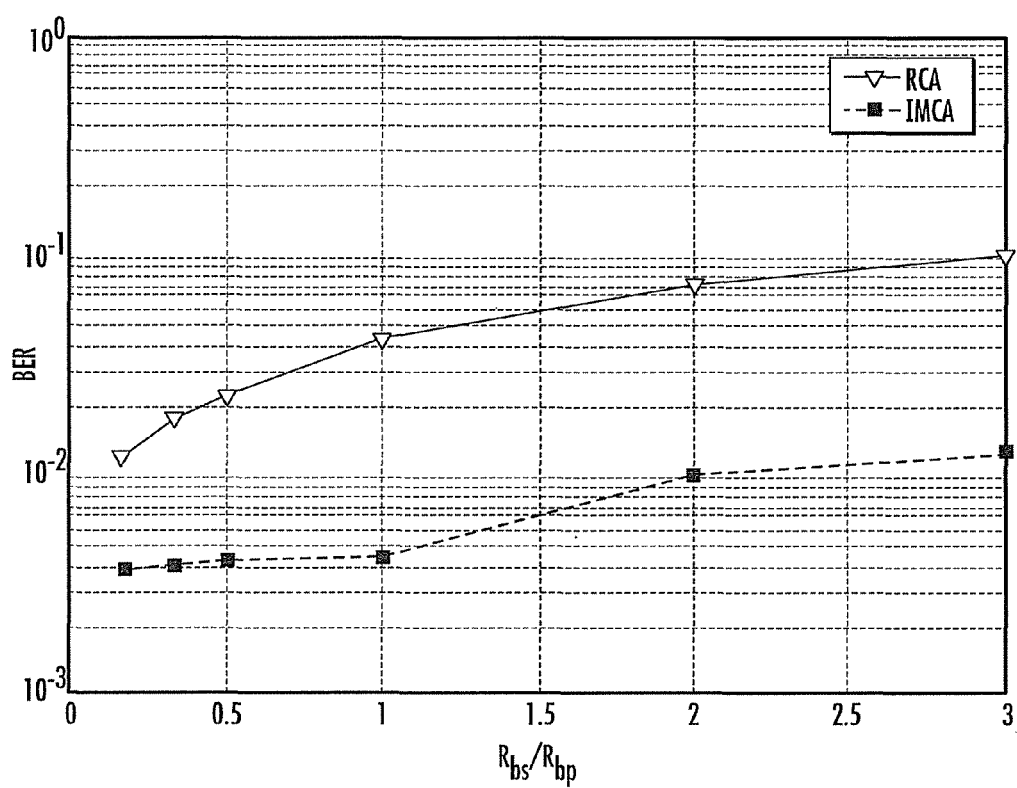
FIG. 15 is a diagram showing performance of the IMCA and RCA schemes using MF receiver in Rayleigh fading channel N=7, $K_p$=2, $K_s$=3, $R_{cs}$=6, $R_{cp}$, SNR=20 dB according to an embodiment of the subject matter disclosed herein.

FIG. 15 shows the BER of a secondary user in a system with number of primary users equals 2. The number of secondary users equals 3. The secondary system chip rate is six times the chip rate of the primary users. The PSD of the secondary system is set to ⅙ from the primary user PSD. We plot the BER versus the ratio of the secondary user bit rate to the primary user bit rate. For a BER of 0.001, the value of $R_{bs}/R_{bp}$ is less than 1/6 using RCA scheme and $R_{bs}/R_{bp}=3$ for IMCA scheme. So using the IMCA scheme will lead to better throughput for a certain BER.

Figure 16:
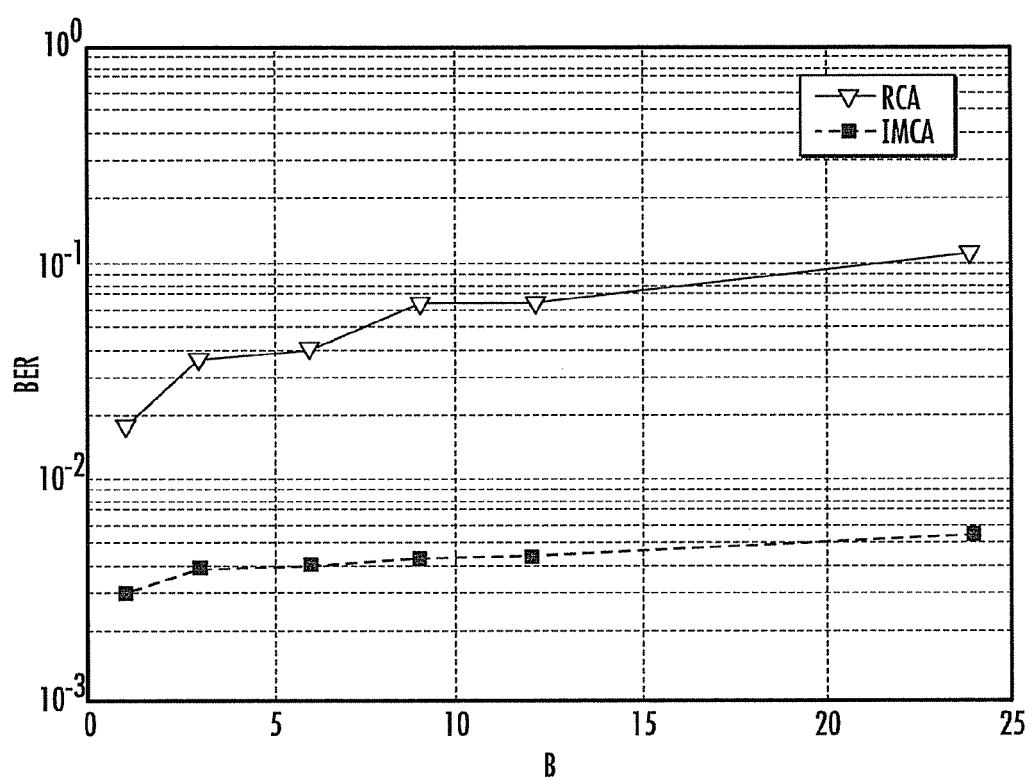
FIG. 16 is a diagram showing performance of the IMCA and RCA schemes using MF receiver in Rayleigh fading channel N=7, $K_p$=2, $K_s$=3, $R_{cs}$=6, $R_{cp}$, $R_{bs}$=$R_{bp}$, SNR=20 dB according to an embodiment of the subject matter disclosed herein.

FIG. 16 shows the BER of a secondary user versus the change of the ratio between PSD of the secondary system to the primary user PSD level. The same parameters of FIG. 3 were used with $R_{bs}/R_{bp}$ equals 1. It shows that the secondary system with IMCA scheme performs even with low PSD level.

Figure 17:
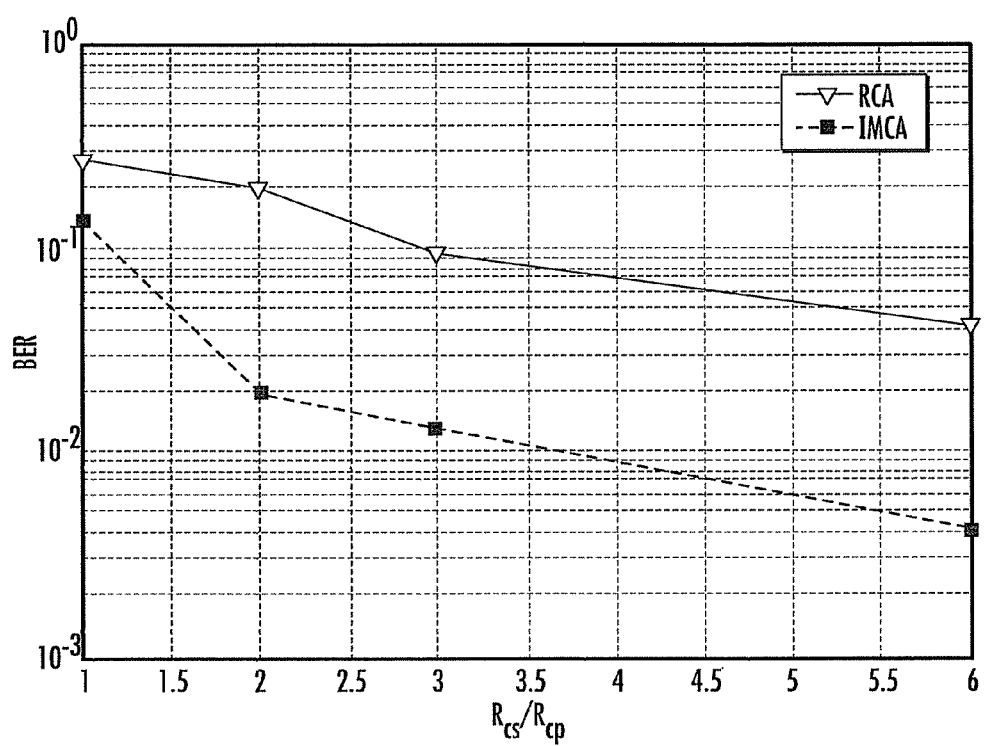
FIG. 17 is a diagram showing performance of the IMCA and RCA schemes using MF receiver in Rayleigh fading channel N=7, $K_p$=2, $K_s$=3, $\beta$=12, $R_{cp}$, SNR=20 dB according to an embodiment of the subject matter disclosed herein.

FIG. 17 shows the BER of a secondary user versus the change of the ratio of the chip rate of the secondary system to the chip rate of the primary system. The same parameters of FIG. 3 were used with $R_{bs}/R_{bp}$ equals 1. The figure shows that secondary system with IMCA scheme uses the bandwidth more effectively than RCA scheme. The system using IMCA can give the same performance as RCA with much smaller bandwidth.

In the examples described above IMCA is used to select a spreading code that minimizes multiple access interference. In one example, IMCA can be used to select codes from a pre-stored codebook by applying the IMCA method, i.e. by substituting all codes in the codebook in equation (1) and selecting the one that minimizes.

IMCA as described herein can further be used in systems that use long cover codes in addition to short spreading codes. In UMTS cellular networks a short code option is available on the uplink and the IMCA scheme is directly applicable. In other networks that use long cover codes, the IMCA is applicable after removing, i.e. de-spreading, the long cover code. On the downlink, cellular standards, e.g. UMTS, typically use a pilot channel that transmits the cover code. This cover code is acquired by the mobile stations as a necessary step for subsequent communications. Since the downlink transmissions are synchronous, the cover code may be easily removed, even under asynchronous multipath fading conditions, and the IMCA scheme applied by the mobile station. In some cellular standards, there is a synchronous mode on the uplink, in which the base station sends periodic timing adjustments to the mobiles so that they maintain synchronization. In that case, the long cover code, if it exists, may be removed and the IMCA scheme applied.

IMCA as described herein may be used for re-assigning the secondary user codes for existing users due to changing conditions. For example, if the overall bandwidth available in the network degrades, due to weather or other conditions, it may be useful to apply IMCA to re-assign spreading codes among existing users to minimize interference among such users.

In the examples described above, IMCA is used by the base station to select a spreading code to be used on the downlink channel. However, the subject matter described herein is not limited to IMCA being used by the base station to assign codes for the uplink channel. For example, a mobile handset may use IMCA as described herein to select an optimal spreading code to be used on the downlink channel. Of course, in that case mobile sets may apply IMCA individually, in which case the base station will make the final decision, after receiving the mobile station recommendations on code assignment, on what codes it will use on its downlink transmissions to each mobile station.

IMCA is described above as being used in CDMA networks. However, IMCA is not limited to use in CDMA networks. For example IMCA can be used to select optimal spreading codes in next generation networks, including MIMO networks.

It will be understood that various details of the presently disclosed subject matter may be changed without departing from the scope of the presently disclosed subject matter. Furthermore, the foregoing description is for the purpose of illustration only, and not for the purpose of limitation.

REFERENCES

1. Srinivasa S, Jafar S A. The throughput potential of cognitive radio: a theoretical perspective. *IEEE Communications Magazine* 2007; 74-79.
2. NTIA.FCCFrequency Allocation Chart, 2003; http://www.ntia.doc.gov/osmhome/allochrt.pdf.
3. Kolodzy P J. Cognitive Radio Fundamentals, SDR Forum, Singapore, April 2005.
4. Chiani M, Giorgetti A, Liva G. Ultra wide bandwidth communications towards cognitive radio, EMC Europe Workshop 2005; Rome, Italy; 114-117.
5. Arslan H, Sahin M E. Narrowband interference issues in ultra wideband systems. In *Ultra Wideband Wireless Communications*, Arslan H, Chen Z N, Ben M-G D (eds.) John Wiley & Sons, Inc.: Hoboken, N.J., 2006.
6. Federal Communications Commission. Revision of part 15 of the commission's rules regarding ultra-wideband transmission systems, first report and order (ET Docket 98-153), Adopted Feb. 14, 2002 Released Apr. 22, 2002.
7. Attar A, Nakhai M R, Aghvami A H. Cognitive radio transmission based on direct sequence MC-CDMA, *IEEE Transaction on Wireless Communications* 2008; 7: 1157-1162.
8. Kafle P L, Sesay A B. Iterative semi-blind multiuser detection for coded MC-CDMA uplink system. IEEE Transactions on Communications 2004; 51(7): 1034-1039.
9. Høst-Madsen A, Cho K S. MMSE/PIC multiuser detection for DS/CDMA systems with inter- and intra-cell interference. IEEE Transactions on Communications 1999; 47(2): 291-299.
10. Mao Z, Bhargava V K. Semiblind linear parallel interference cancellation multiuser detectors for DS-CDMA systems. IEEE Transactions on Wireless Communications 2005; 4(4): 1319-1324.
11. Honig M, Madhow U, Verdu S. Blind adaptive multiuser detection. IEEE Transactions on Information Theory 1995; 41: 944-960.
12. Lupas R, Verdu S. Linear multiuser detectors for synchronous code-division multiple access channels. IEEE Transactions on Information Theory 1989; IT-35: 123-136.
13. Varanasi M K, Aazhang B. Multistage detection in asynchronous code-division multiple-access communications. IEEE Transactions on Communications 1990; 38: 509-519.
14. Elezabi A. Improved viterbi decoder metrics for two-stage detectors in DS-CDMA systems. IEEE Transactions on Wireless Communications 2004; 3: 1399-1404.
15. Elezabi A. Reliability-based partial parallel interference cancellation and iterative decoding for DS-CDMA over fading channels, IEEE International Conference on Communications, Glasgow, Scotland, June 2007.
16. Abd-El Aziz M M, El-Ramly S H. Performance analysis of a multistage quasi-orthogonal minimum output energy multiuser detector for turbo coded CDMA systems in multipath environment. IEEE Vehicular Technology Conference 2004; 7(60): 749-753.
17. Niekerk B V, Mneney H. Blind iterative MUD with error coding. AFRICON 2004 2004; 1: 179-184.
18. Schober R, Gerstacker W H, Lampe L. Data-aided and blind stochastic gradient algorithms for widely linear MMSE MAI suppression for DS-CDMA. IEEE Transactions on Signal Processing 2004; 52(3): 746-756.

19. Wolkowicz H, Saigal R, Vandenberghe L. Handbook on Semidefinite Programming, Kluwer: Massachusetts, USA, 2000.
20. S. Srinivasa and S. A. Jafar, "The throughput potential of Cognitive Radio: A theoretical perspective" IEEE Communications Magazine, May 2007, pp. 74-79.
21. P. J. Kolodzy, "Cognitive Radio Fundamentals," SDR Forum, Singapore, April 2005.
22. A. Elezabi, M. Kashef, M. Abdallah and M. Khairy, "CDMA Underlay Network with Cognitive Interference-Minimizing Code Assignment and Semi-Blind Interference Suppression," Journal on Wireless Communication and Mobile Computing DOI:10.1002/wcm.724.
23. 3rd Generation Partnership Project: Technical Specification Group Radio Access Network: Spreading and Modulation (TDD) (Release 1999).
24. M. Kashef, M. Abdallah, A. Elezabi, M. Khairy, "System Parameter Selection for Asymmetric Underlay CDMA Networks with Interference-Minimizing Code Assignment," IEEE SPAWC, June 2009, Italy.
25. S. Srinivasa and S. A. Jafar, "The throughput potential of Cognitive Radio: A theoretical perspective" IEEE Communications Magazine, May 2007, pp. 74-79.
26. P. J. Kolodzy, "Cognitive Radio Fundamentals," SDR Forum, Singapore, April 2005.
27. M. Chiani, A. Giorgetti, G. Liva, "Ultra Wide Bandwidth communications towards Cognitive Radio," EMC Europe Workshop 2005, Rome, Italy, pp. 114-117.
28. H. Arslan and M. E. Sahin, "Ultra Wideband Wireless Communications." Hoboken, N.J.: John Wiley & Sons, Inc., 2006, chapter Narrowband Interference Issues in Ultrawideband Systems.
29. Federal Communications Commission, "Revision of part 15 of the commission's rules regarding ultra-wideband transmission systems, first report and order (ET Docket 98-153)," Adopted Feb. 14, 2002, Released Apr. 22, 2002.
30. A. Elezabi, M. Kashef, M. Abdallah and M. Khairy, "Cognitive Interference-Minimizing Code Assignment for Underlay CDMA Networks in Asynchronous Multipath Fading Channels," IWCMC June 2009, Germany.

What is claimed is:

1. A method for interference-minimizing spreading code assignment, the method comprising:
at a base station configured to operate in a code division multiple access (CDMA) radio network:
receiving transmissions from user devices seeking to access the CDMA radio network; and
for a first user device seeking to access the network, selecting, without knowledge of spreading codes used by existing users currently transmitting over the network using CDMA signaling and based on a combined received CDMA signal of the existing users currently transmitting the CDMA signals over the network, a spreading code, using at least one cross-correlation parameter, for the user device to reduce multiple access interference between communications involving the first user device and other devices using the CDMA network represented by the combined received CDMA signal of the existing users.

2. The method of claim 1 wherein the cross-correlation parameter includes a mean square cross-correlation between a candidate code and a received signal from the CDMA network.

3. The method of claim 1 wherein the CDMA network includes a primary network and a secondary underlay CDMA network.

4. The method of claim 3 wherein the first user device comprises a secondary network device and wherein selecting the spreading code includes selecting a code that reduces the effect of transmissions between users of the primary network on transmissions involving the first user device.

5. The method of claim 1 wherein the CDMA network includes a single level of network users and wherein selecting the spreading code includes selecting the spreading code to reduce interference between transmissions involving devices of users in the same level as the first user device.

6. The method of claim 5 wherein selecting the spreading code includes selecting the spreading code without knowledge of bit timings.

7. The method of claim 3 wherein the primary network comprises one of a bit-synchronous, chip-synchronous network; a bit-asynchronous, chip-synchronous network; and a bit-asynchronous, chip-asynchronous network.

8. The method of claim 7 wherein if the network is either bit-synchronous or chip-synchronous, deriving a bit or chip epoch.

9. The method of claim 1 comprising adjusting at least one system parameter of the first and at least one second user device to achieve a desired network performance parameter.

10. The method of claim 9 wherein the network performance parameter comprises a bit error rate.

11. The method of claim 10 wherein adjusting at least one system parameter includes adjusting at least one of a bit rate and a chip rate of the first and the at least one second user device.

12. The method of claim 10 wherein adjusting at least one system parameter of the first and at least one second user includes adjusting the system parameter for users within the same user class.

13. The method of claim 1 wherein selecting a spreading code includes limiting a search space of possible spreading codes.

14. The method of claim 1 wherein receiving transmissions from user devices includes receiving transmissions from user devices over an asynchronous multipath fading channel.

15. The method of claim 1 wherein selecting the spreading code comprises substituting codes from a codebook into a predetermined interference minimizing equation and selecting a code from the codebook that minimizes the equation.

16. The method of claim 1 wherein the first user device selects a spreading code to use for downlink transmissions from the base station using at least one cross correlation parameter to minimize multiple access interference on downlink transmissions.

17. The method of claim 1 wherein selecting the spreading code includes selecting the spreading code to be applied as a short spreading code for a signal after receiving the signal and removing a long cover code from the signal.

18. The method of claim 1 wherein the code division multiple access network comprises a multiple input, multiple output (MIMO) network.

19. The method of claim 1 comprising reassigning codes among user devices in response to changing network conditions.

20. A base station configured to operate in a code division multiple access (CDMA) radio network for interference-minimizing spreading code assignment, the base station comprising:
a communications module for receiving transmissions from user devices seeking to access the CDMA radio network; and
an interference-minimizing code assignment (IMCA) module for selecting, without knowledge of spreading codes used by existing users currently transmitting over the network using CDMA signaling and based on a combined received CDMA signal of the existing users currently transmitting the CDMA signals over the network, using at least one cross-correlation parameter, a spreading code for a first user device seeking to access the network to reduce multiple access interference between communications involving the first user device and other devices using the CDMA network represented by the combined received CDMA signal of the existing users.

21. The base station of claim 20 wherein the cross-correlation parameter includes a mean square cross-correlation between a candidate code and a received signal from the CDMA network.

22. The base station of claim 20 wherein the CDMA network includes a primary network and a secondary underlay CDMA network.

23. The base station of claim 22 wherein the first user device comprises a secondary network device and wherein selecting the spreading code includes selecting a code that reduces the effect of transmissions between users of the primary network on transmissions involving the first user device.

24. The base station of claim 20 wherein the CDMA network includes a single level of network users and wherein selecting the spreading code includes selecting the spreading code to reduce interference between transmissions involving devices of users in the same level as the first user device.

25. The base station of claim 20 wherein the IMCA module is configured to select the spreading code without knowledge of bit timings and spreading codes assigned to other users.

26. The base station of claim 20 wherein the IMCA module is configured to select the spreading code with knowledge of bit timings and spreading codes assigned to other users.

27. The base station of claim 22 wherein the primary network comprises one of a bit-synchronous, chip-synchronous network; a bit-asynchronous, chip-synchronous network; and a bit-asynchronous, chip-asynchronous network.

28. The base station of claim 27 comprising a bit epoch acquisition module configured to derive a bit or chip epoch if the network is either bit-synchronous or chip-synchronous.

29. The method of claim 20 comprising a system parameter selection module configured to adjust at least one system parameter of the first and at least one second user device to achieve a desired network performance parameter.

30. The base station of claim 29 wherein the network performance parameter comprises a bit error rate.

31. The base station of claim 30 wherein the system parameter selection module configured to adjust at least one of a bit rate and a chip rate of the first and the at least one second user device.

32. The base station of claim 30 wherein the system parameter selection module configured to adjust the system parameter for users within the same user class.

33. The base station of claim 20 wherein the IMCA module is configured to limit a search space of possible spreading codes using a limiter function.

34. The base station of claim 20 wherein the communications module is configured to receive transmissions from user devices over an asynchronous multipath fading channel.

35. A non-transitory computer readable medium having stored thereon computer executable instructions that when executed by the processor of a computer perform steps comprising:
at a base station configured to operate in a code division multiple access (CDMA) radio network:
receiving transmissions from user devices seeking to access the CDMA radio network; and
for a first user device seeking to access the network, selecting, without knowledge of spreading codes used by existing users currently transmitting over the network using CDMA signaling and based on a combined received CDMA signal of the existing users currently transmitting the CDMA signals over the network, a spreading code, using at least one cross-correlation parameter, for the user device to reduce multiple access interference between communications involving the first user device and other devices using the CDMA network represented by the combined received CDMA signal of the existing users.

* * * * *